(12) United States Patent
Nelson et al.

(10) Patent No.: US 6,421,323 B1
(45) Date of Patent: Jul. 16, 2002

(54) METHOD AND APPARATUS FOR ANALYZING EVENTS IN A TELECOMMUNICATIONS SYSTEM

(75) Inventors: Derek J. Nelson, San Diego; Paul R. Hartmann, Escondido; Edward S. Tyburski, Carlsbad, all of CA (US)

(73) Assignee: Applied Digital Access, Inc., Dover, DE (US)

( * ) Notice: Subject to any disclaimer, the term of this patent is extended or adjusted under 35 U.S.C. 154(b) by 0 days.

(21) Appl. No.: 08/713,027

(22) Filed: Sep. 12, 1996

Related U.S. Application Data

(63) Continuation-in-part of application No. 08/372,819, filed on Dec. 23, 1994, now Pat. No. 5,566,161.

(51) Int. Cl.<sup>7</sup> ......... G01R 31/08; G06F 11/00; G08C 15/00; H04J 1/16
(52) U.S. Cl. ......... 370/249; 370/252; 370/470; 370/526; 379/26.02; 379/27.01
(58) Field of Search ........... 370/241, 242, 370/243, 244, 245, 246, 247, 248, 249, 250, 252, 253, 470, 526; 379/26.02, 27.01; 714/798, 799, 819, 25, 26, 27, 46, 47, 48; 709/223–229, 1.01, 2, 9.03, 9.04; 345/733, 734–736

(56) References Cited

U.S. PATENT DOCUMENTS

| | | | |
|---|---|---|---|
| 4,376,998 A | * 3/1983 | Abbott et al. | 370/225 |
| 4,376,999 A | * 3/1983 | Abbott et al. | 370/217 |
| 4,566,094 A | 1/1986 | Ardon et al. | |
| 4,601,028 A | * 7/1986 | Huffman et al. | 370/217 |
| 4,797,654 A | 1/1989 | Young et al. | |
| 4,882,727 A | 11/1989 | Williams et al. | |
| 4,890,254 A | 12/1989 | Cooley | |
| 4,958,342 A | 9/1990 | Williams et al. | |
| 5,058,104 A | * 10/1991 | Yonehara et al. | 370/242 |
| 5,063,564 A | * 11/1991 | Crandall et al. | 370/522 |
| 5,208,803 A | * 5/1993 | Conforti et al. | 370/241 |
| 5,233,600 A | * 8/1993 | Pekarske | 370/228 |
| 5,295,132 A | * 3/1994 | Hashimoto et al. | 370/242 |
| 5,309,448 A | * 5/1994 | Bouloutas et al. | 714/25 |
| 5,343,461 A | * 8/1994 | Barton et al. | 370/249 |
| 5,347,576 A | 9/1994 | Taylor | |

\* cited by examiner

Primary Examiner—David Vincent
Assistant Examiner—Bob A. Phunkulh
(74) Attorney, Agent, or Firm—Heller Ehrman White & McAuliffe

(57) ABSTRACT

A method and apparatus for automated sectionalization of a DS1/DS3 data path based upon information received at a single location along the path. A test and monitor device is located at a point of demarcation between an LEC and an IEC. A Remote Module is located at a point of demarcation between the LEC and CPE. The test and monitor device is fully ANSI compatible. The information that is received is processed in a three step process in order to generate a "Sectionalizer Report". In preparing the Sectionalizer Report, the information output from a filter is used to determine where particular Events originated.

17 Claims, 19 Drawing Sheets

METHOD AND APPARATUS FOR ANALYZING EVENTS IN A TELECOMMUNICATIONS SYSTEM

RELATED APPLICATIONS

The present application is a continuation-in-part of U.S. patent application Ser. No. 08/372,819, filed on Dec. 23, 1994, now U.S. Pat. No. 5,566,161, and assigned to the assignee of the present application, which is incorporated herein by reference.

BACKGROUND OF THE INVENTION

1. Field of the Invention

This invention relates to telecommunications systems, and more particularly to a method and apparatus for detecting and determining the point of origin of events in a telecommunications system.

2. Description of Related Art

Public Switched Telephone Networks (PSTN) commonly utilize Time Division Multiplexing (TDM) transmission systems to communicate both voice and data signals over a digital communications link. For example, DS1 (digital signal level 1) data paths are currently used to carry both voice and data signals over a single transmission facility. DS1 paths carry DS1 signals which are transmitted at a nominal rate of 1.544 Mb/s. DS1 paths reduce the number of lines required to carry voice and data signals. Data paths, such as DS1 paths, have a portion of the data transmission capability assigned to communicating customer information from one end of the data path to the other. This portion of the transmission capability is commonly referred to as the "payload". In addition, another portion of the transmission capability is assigned to overhead functions, such as error detection and maintaining the data path. This portion of the transmission capability is commonly referred to as "overhead".

DS1 facilities are used in large part to carry signals switched by components of the PSTN. However, point-to-point DS1 data links are also used to interconnect equipment controlled by different data users. A typical DS1 signal path is shown in FIG. 1. DS1 transmission systems, like the one shown in FIG. 1, include three general equipment types: (1) terminating equipment, (2) user interface equipment, and (3) transmission equipment. Terminating equipment 10 primarily serves to build the DS1 1.544 Mb/s TDM signal from the various sub-rate voice and data signals. Terminating equipment 10 typically performs Pulse Code Modulation (PCM) and TDM functions. The terminating equipment 10 also de-multiplexes the 1.544 Mb/s DS1 signal to separate voice and data signals at their original sub-rates.

The user interface equipment typically comprises a Channel Service Unit (CSU) 20 which connects the terminating equipment 10 with the transmission equipment 30, such as a DS1 path and ensures that both ends of the DS1 paths 30 send and receive a high quality DS1 signal. The CSU 20 typically checks for conformance to certain standards which are set by the telecommunications industry. The CSU 20 corrects and detects errors in the DS1 transmission path. For example, the CSU 20 corrects Bipolar Violations (BPV). In addition, the CSU 20 detects various errors and inserts alarm indications and zero substitution codes in the DS1 transmission path, including Remote Alarm Indication (RAI), Alarm Indication Signal (AIS), and Bipolar with Eight-Zero Substitution (B8ZS) signals.

The DS1 path 30 includes hardware used by the network providers to transmit DS1 digital signals between equipment controlled by different data users. The DS1 path 30 as shown in FIG. 1 is implemented by a T1 line. However, other facilities, such as coaxial cables, fiber optic cables, and microwave links may be used by providing an appropriate transport interface between the Channel Service Unit (CSU) 20 and the facility.

DS1 signals may be transmitted over a dedicated point-to-point network as simple as the one shown in FIG. 1 utilizing twisted wire pairs and repeaters spaced at intermediate points. Alternatively, the network may be as complex as the one shown in FIG. 2 which utilizes a combination of twisted wire pairs and repeaters, multiplexers, Digital Cross-connect Systems (DCS), Add Drop Multiplexers (ADM), Fiber Optic Terminals (FOT), Coaxial Cable, Microwave, Satellite, or any other transmission media capable of transporting a DS1 signal. In some instances, DS1 signals may be carried over a network similar to the point-to-point network, but having the added capability to switch the DS1 signal (in a DCS or ADM) in a manner similar to the PSTN.

While DS1 transmission systems such as the system shown in FIG. 1 are well-known, customers more typically communicate using a public DS1 network, as shown in FIG. 2. In the DS1 transmission system shown in FIG. 2, equipment is divided into categories based on the location of the equipment. Essentially, the equipment is broken into three categories: (1) the Customer Premises Equipment (CPE) 40; (2) the Local Exchange Carrier (LEC) equipment, which comprises the local loop 42 and the central office equipment; and (3) the InterExchange Carrier (IEC) 52. CPE 40 belongs to the network user (or customer). The customer that owns the CPE 40 is responsible for both its operation and maintenance. The customer must ensure that its equipment provides a healthy and standard DS1 digital signal to the local exchange carrier equipment 42. The equipment 40 on the customer premises typically consists of DS1 multiplexers 46, digital Private Branch Exchanges (PBXs), and any other DS1 terminating equipment which connects to a CSU 20 at the CPE site. The local exchange carrier equipment 42 connects the CPE 40 with the central office 44 and the IEC 52. LECs assume responsibility for maintaining equipment at the line of demarcation between the CPE 40 and the local loop 42.

As shown in FIG. 2, a Network Interface Unit (NIU) 50 may be coupled between the CPE 40 and the LEC equipment 42. The NIU 50 represents the point of demarcation between the CPE 40 and the LEC equipment 42 (which comprises local loop equipment 42, and Central Office (CO) equipment 44). Prior art NIUs may be relatively simple devices which allow network technicians to minimally test the operation and performance of both the CPE 40 and the DS1 network 52 or they may be more sophisticated devices.

The CO equipment 44 may include equipment that can monitor for various DS1 signal requirements. Independent of whether the DS1 transmission system is simple (FIG. 1), complex (FIG. 2), or switched, all the circuits and network equipment required to transmit a DS1 signal must be tested and maintained to operate at maximum efficiency. In order to perform such test and maintenance functions, equipment within the DS1 path provides maintenance signals indicative of particular conditions on the incoming and outgoing signals. These signals are defined by standards established by the American National Standards Institute for operation of DS1 communications links (ANSI T1.403 and ANSI T1.408, et. al). These indications include (1) RAI, which indicates that the signal that was received by the CPE equipment from the NIU 50 was lost (the detailed requirements for sending RAI are contained in ANSI T1.231); and (2) AIS, which is an unframed, all-ones signal which is transmitted to the network interface upon loss, or in response to the presence of a signal defect of the originating signal, or when any action is taken that would cause a service disruption (such as loopback). In addition, detection of signal defects in the digital hierarchy above DS1 shall cause an AIS signal to be generated. The AIS signal is removed when the condition that triggered the AIS is terminated.

In addition to these indications, ANSI T1.403-1995 defines a performance report message (PRM) which is sent each second using a format which is detailed in the standard. PRMs contain performance information within a "message field" portion of the PRM for each of four previous one-second intervals. Counts of cyclic redundancy checking (CRC) errors are accumulated in each contiguous one-second interval by the reporting equipment. For example, a one bit (designated "G1" by the ANSI standard) within the variable portion of the PRM indicates that one CRC error had occurred within the last second of transmission. At the end of each one-second interval, a modulo-4 counter within the variable portion of the PRM is incremented, and the appropriate performance bits are set within the remainder of the variable portion of the report in accordance with the PRM format provided in the specification. Other bits indicate that: (1) between 2 and 5 CRC events had occurred; (2) between 6 and 10 CRC events had occurred; (3) between 11 and 100 CRC events had occurred; (4) between 101 and 319 CRC events had occurred; (5) greater than 319 CRC events had occurred; (6) at least one severely errored framing event had occurred; (7) at least one frame synchronization bit error event had occurred; (8) at least one line code violation event had occurred; and (9) at least one slip event had occurred. The number and type of Events indicates the quality of transmission. Each Event is defined within ANSI T1.403.

Performance reports may be also be generated and transmitted in accordance with AT&T PUB 54016 Performance Reporting. PRMs are only transmitted by equipment that conforms to the Extended Superframe Format (ESF) described in ANSI T1.403. PRMs provide information that can be used in "Sectionalization" of the DS1 path. Sectionalization is a process by which several sections of a data path are analyzed to determine in which section a communication problem originates. In particular, for the purposes of this discussion, sectionalization refers to determining whether a problem in the DS1 path originates within the CPE equipment 40 (for which the customer is responsible), the LEC equipment 42, 44 (for which the local exchange carrier is responsible) or the T1 network equipment 52 (for which the Intermediate Exchange Carrier (IEC) is responsible).

Currently, when a problem is reported on a DS1 path, sectionalization of the path is performed by sending a technician to several points along the path to collect data. The collected data is then reviewed by the technician in an attempt to determine the point of origin of a problem. Since the equipment that makes up the path is physically distributed over a large geographic region (equipment at one end of the path may be thousands of miles from equipment at the other end of the path) it is typical for several technicians to become involved in the sectionalization of the path. Each technician must be highly skilled and trained in order to collect the data from the various points along the path. In some cases, the revenue bearing signals being transmitted over the path must be disrupted in order to perform tests which generate data to be collected or in order to collect data that is developed in real time during the transmission of the revenue generating signals. In many cases the responsibility for sectionalizing the DS1 path must be shared by the LEC, IEC, and customer, since each party is responsible for maintaining a portion of the equipment that makes up the path. Accordingly, each party incurs an expense when equipment maintained by any of the other parties experiences a problem.

Furthermore, out-of-service testing causes "live" traffic to be removed from the DS1 link before testing commences. In out-of-service testing, a test instrument transmits a specific data pattern to a receiving test instrument that anticipates the sequence of the pattern being sent. Any deviation from the anticipated pattern is counted as an error by the receiving test instrument. Out-of-service testing can be conducted on a "point-to-point" basis or by creating a "loop-back". Point-to-point testing requires two test instruments (a first instrument at one end of the DS1 transmission system, and a second instrument at the other end of the DS1 transmission system). By simultaneously generating a test data pattern and analyzing the received data for errors, the test instruments can analyze the performance of a DS1 link in both directions.

Loop-back testing is often used as a "quick check" of circuit performance or when attempting to isolate faulty equipment. In loop-back testing, a single test instrument sends a "loop-up" code to a loop back device, such as the CSU at the far end, before data is actually transmitted. The loop-up code causes all transmitted data to be looped back by the CSU in the direction toward the test instrument. By analyzing the received data for errors, the test instrument measures the performance of the link up to and including the far end CSU. Because loop-back testing only requires a single test instrument, and thus, only one operator, it is a convenient testing means.

Both point-to-point and loop-back tests allow detailed measurements of any DS1 transmission system. However, because both testing methods require that live, revenue-generating traffic be interrupted, they are undesirable. Thus, out-of-service testing is inherently expensive and undesirable. It is therefore desirable to perform in-service monitoring of "live" data to measure the performance and viability of DS1 transmission systems. Because in-service monitoring does not disrupt the transmission of live, revenue-generating traffic, it is suitable for routine maintenance and it is preferred by both the LECs and their customers.

Referring again to FIG. 2, the prior art NIUs 50 disadvantageously provide only intrusive test and performance monitoring functionality. End-user customers object to the service interruptions and disruptions required by the out-of-service testing performed by the prior art NIUs 50. The LECs install the NIUs 50 at the demarcation point between the CPE 40 and the LEC portions of the network (i.e., at the interface to the local loop 42). The prior art NIUs 50 typically have provided the LECs with a loop-back point for testing DS1 digital circuits to the network boundary. Disadvantageously, customer circuits may be taken out-of-service for intrusive testing only with customer permission. Customers typically do not authorize such intrusive testing means unless a circuit is completely unusable.

There are several types of NIUs 50 currently in use. One of the most popular types of NIUs 50 is the "Smart Jack" available from Westell, Inc., located in Oakbrook, Ill. The Smart Jack NIU with Performance Monitoring (PM) allows the LECs to determine what errors are received and generated by the CPE 40. A major disadvantage of the Smart Jack NIU is that the NIU accumulates PM data and stores the data in a local buffer for later retrieval by LEC personnel. Data retrieval in most areas requires that a circuit be taken completely out-of-service and that the NIU be commanded intrusively using a proprietary command set. Furthermore, the Smart Jack NIU disadvantageously provides no practical method for the LECs to retrieve the performance monitor data collected by the Smart Jack NIU. While the Smart Jack NIU does allow non-intrusive transmission of PM data from the Smart Jack to the central office, a paralleling maintenance line must be provided. Most DS1 installations to customer premises, however, do not provide such maintenance lines.

Other NIUs 50 are available from Wescom Integrated Network Systems (WINS), the Larus Corporation, and Teltrend, Inc. All of the prior art NIUs 50 suffer the disadvantages associated with out-of-service monitoring and testing. Therefore, there is a need for an improved NIU 50 which provides non-intrusive maintenance performance monitoring at the point of demarcation between the CPE 40 and the LEC equipment.

In addition to being unable to provide non-intrusive monitoring of DS1 digital equipment, the prior art NIUs 50 are unable to provide an indication of a loss of signal (LOS) caused by the CPE 40 which is distinguishable from LOSs that are caused by failure of the network equipment. Currently, LOS caused by the CPE 40 generates alarms in the LEC central office equipment 44 which are indistinguishable from the alarms generated in response to LOSs caused by equipment failures in the local loop 42, Central Office 44, or DS1 network 52. Therefore, there is a need for an improved NIU which allows the LECs to distinguish LOS alarm signals caused by loss of signal within the CPE 40 from alarms which originate due to loss of signal within the LEC or network. With such an improved NIU, the LECs can then decide whether to notify their customers of the LOS indication or to ignore the indication as they deem appropriate.

In addition to these disadvantages, the prior art NIUs 50 do not permit the LECs to control the frame format of data transmitted by their customers and transmitted over the LECs' networks. In general, DS1 signals can be transmitted to the local loop 42 using four basic DS1 frame formats: (1) Super Frame format (SF); (2) Extended Superframe Format (ESF) without Performance Report Messages (PRMs); (3) ESF with AT&T PUB 54016 Performance Reporting; and (4) ESF with ANSI T1.403 Performance Report Messages (PRMs). Most DS1 signals are transmitted using the SF format, and the remainder are transmitted by the CPE 40 using a mix of ESF format types. Performance monitoring capabilities of the various formats range from poor in the case of SF (most of the data is not monitored), to excellent, in the case of ESF with ANSI T1.403 PRMs. The difficulty faced by the LECs is that their ability to monitor data and transmission performance is tied to the frame format used by the CPE 40. Because the customer is responsible for the CPE 40, the LECs are unable to control the frame format used and thus the level and extent of performance monitoring and testing that is achievable. The present invention allows the LECs to control the frame format of data by converting the frame format transmitted by the CPE 40.

The ESF format has long been recognized as the single most important change occurring in the telephone network with respect to the quality of service provided on DS1 circuits because it addresses the above-stated need for non-intrusive monitor and test capability. ESF allows customers to continuously and non-intrusively monitor the performance of their DS1 facilities while the applications remain active and thus income-generating. ESF performance monitoring provides both a precise performance report and a proactive maintenance tool. With ESF performance data, a customer can determine correlations between data application performance (response time) and errors which occur on the DS1 facilities. This can aid in troubleshooting end-user response time problems. By looking at the error conditions, the cause of the increased response time can be determined and the appropriate action can be taken.

In addition, the ESF frame format offers the network providers the ability to "sectionalize" problems occurring in the network. By placing ESF monitoring equipment throughout the network, an LEC can monitor the various facilities that make up an end-to-end customer circuit. When customers complain about a degraded or unavailable circuit, the LEC can use the ESF format to locate the faulty link in a real time, non-intrusive manner.

Although the ESF frame format has long been recognized as a tremendous benefit, it has gained little acceptance and use in the CPE 40. Therefore, there is a need for an improved NIU which allows telephone companies to add the ESF functionality to existing DS1 circuits. There is also a need for an improved NIU which will provide telephone companies an adaptive way to increase the number of circuits that use the preferred ESF signal format as the circuit enters the LEC equipment. Moreover, there is a need to combine the functions of network interface, circuit loop-back, frame format conversion, CPE loss of signal detection, and signal degradation detection functionality together in an inexpensive and easily accessible NIU. The present invention provides such an improved NIU.

In addition to the problems which arise due to the inability of CSUs to use ESF frame formatting, it is currently difficult to collect at the Operations System (OS) a sufficient amount of data unobtrusively in real-time to allow automated sectionalization of a data path. Current systems provide for monitoring each data path at the CPP and storing information in the monitoring device until a request is made to communicate the information stored to the OS. However, due to the large amount of information which must be stored, the data is stored in a manner which does not allow the time at which an event occurs to be known with better than a 15 minute resolution. Accordingly, if more than two Events occur in the same 15 minute interval, the ability to distinguish one event from the other is lost. Furthermore, unless there is a reason to suspect a problem on a particular data path, the data is not requested. Still further, in prior art data paths in which data is collected and transmitted at regular intervals (such as by PRMs generated by a CSU) this data is not collected at the network interface, and therefore the ability to sectionalize the data path does not correlate with the portions of the data path which different organizations are responsible for maintaining.

Accordingly, it would be desirable to provide a system which sectionalizes a DS1 path to allow each of the parties responsible for maintaining equipment along the path to determine which party is responsible for the problem. Furthermore, it would be desirable to reduce the cost of sectionalizing a DS1 path by determining the location of the origin of the problem without sending a highly skilled technician to a plurality of locations along the path. Still further, it would be desirable to provide such a system which is capable of sectionalizing a DS1 path in "real-time" without disrupting revenue bearing signals transmitted over the path. The present invention provides such a system.

SUMMARY OF THE INVENTION

The present invention is an improved network interface unit having an adaptive DS1 frame format conversion device (hereinafter referred to as the "Remote Module") which is used for remotely monitoring the performance of DS1 telephone circuits. The Remote Module is an improved network interface unit which is preferably installed on the network side of an interface between customer premises equipment (CPE) and equipment provided by the network provider. The Remote Module is used to non-intrusively collect and transmit full-time performance monitoring data to the network provider. The Remote Module provides continuous and non-intrusive performance monitoring of DS1 transmission systems. With the Remote Module installed at the interface between the customer's CPE and the LECs' equipment, network service providers are alerted to potential problems before they adversely affect the service provided to their customers. The Remote Module enables a network service provider to quickly and non-intrusively determine whether a problem exists in the equipment provided by the network provider or in the equipment on the customer's premises. The Remote Module, therefore, advantageously eliminates false dispatches and expensive and unnecessary troubleshooting required in systems which use prior art network interface units.

The Remote Module provides non-intrusive testing and monitoring of CPE by facilitating the conversion of CPE-generated signal frame formats to the Extended Superframe Format (ESF) (according to the ANSI T1.403 Standard with Performance Report Message). The present invention performs an adaptive real-time DS1 circuit frame format conversion. The present invention preferably accommodates all DS1 frame formats commonly used in customer premises applications. For example, if the CPE uses an ESF-formatted signal having a maintenance channel using an ANSI T1.403 standard ESF PRM signal, the present invention concatenates additional performance monitoring data, gathered by the Remote Module, onto the CPE-generated signal. In this case, the additional performance monitoring data is "piggy-backed" onto the customer-generated performance report messages. Alternatively, if the customer's DS1 circuit is ESF-formatted, but the ESF Data Link (DL), defined by ANSI T1.403-1995 clause 9.4, is not in use, the DL is used to transport the additional performance monitoring data, and no frame format conversion is performed by the Remote Module. If the customer's DS1 circuit is ESF-formatted and is carrying AT&T PUB 54016 poll and response data, the present Remote Module inserts the ANSI PRMs into the maintenance channel, carefully observing a protocol that will avoid interference with the AT&T maintenance channel commands and responses. The present invention preferably passes unframed signals without modification.

The Remote Module of the present invention is an electronic circuit which combines the network interface, with the NI circuit loop-back, frame format conversion, CPE loss-of-signal detection, and signal degradation monitoring functions together into an inexpensive and compact device. The present invention operates transparently to the CPE. The signals generated by the CPE are returned to their original format before being transmitted to the customer. The CPE, therefore, has no access to the ESF-formatted signals if the ESF signals are not provided by the CPE. Importantly, the Remote Module provides a network loopback function as defined in ANSI T1.403 which carefully avoids superseding or tampering with the CPE loopback functionality. This is important to avoid disrupting the ability of end users to locate trouble in their own DS1 networks.

In addition to accommodating all commonly used DS1 frame formats, the present invention preferably provides an indication of Loss of Signal caused by the CPE which is distinguishable from the LOS signals caused by a failure of equipment provided by the network provider. Upon detection of a Loss of Signal from the network equipment, the Remote Module, similar to the prior art NIUs, sends an Alarm Indication Signal (AIS) to the CPE. However, upon detection of an LOS from the CPE, the present invention preferably transmits a unique code to the network equipment which indicates that the LOS originated from the customer side of the network interface (AIS-CI). The unique code is read as an AIS by elements located in the DS1 transmission system which are not specially equipped to read AIS-CI. AIS and AIS-CI are special signals which suppress downstream LOS indications while, at the same time, alerting surveillance points to the existence of an upstream LOS or other qualifying condition and ensuring proper ones density in the network.

Furthermore, the present invention preferably provides an indication of LOS on the signal received by the CPE which is capable of indicating whether the LOS occurred prior to the signal being received by the Remote Module or between the time the signal is transmitted from the Remote Module and received by the CSU. That is, the present invention is capable of modifying a Remote Alarm Indication (RAI) received from the CSU if the Remote Module received a signal from the network which was not in alarm condition. This modified signal is referred to as an RAI-CI signal.

The present invention includes an auto-provisioning function which facilitates the deployment of multiple Remote Modules. A Remote Module in accordance with the present invention auto-provisions to a frame format conversion mode of operation when it detects the presence of a second Remote Module positioned at a distant end of the DS1 transmission system. The auto-provisioning function allows Remote Modules which are installed subsequent to the installation of other Remote Modules in a DS1 transmission system to begin proper operation without requiring additional expensive site visits by network provider employees. Frame format conversion and other features provided by the present invention are remotely provisionable via an ESF DL. In addition, performance monitoring data is transmitted periodically (i.e., in the preferred embodiment once per second) over the DL, and such data can be non-intrusively accessed at a distant point within the DS1 path.

The present invention also provides a method and apparatus for automated sectionalization of "Events" in a DS1/DS3 data path based upon information received by a single device along the data path. Events are preferably defined as performance primitives and parameters defined in ANSI T1.231 at paragraph 6, et seq. However, in accordance with an alternative embodiment of the present invention, Events may be defined as a subset or super set of these primitives and parameters. The information is processed in order to determine the point of origin of problems detected on the path.

More particularly, a test and monitor device is located at a point of demarcation between a Local Exchange Carrier (LEC) and an Intermediate Exchange Carrier (IEC). In addition, in the preferred DS1/DS3 data path configuration, a Remote Module is located at a point of demarcation between the LEC and the Customer Premises Equipment (CPE). The test and monitor device receives the following information indicating the occurrence of an Event:

(1) Alarm Indication Signals (AISs);
(2) Alarm Indication Signal-Customer Installation (AIS-CI);
(3) Remote Alarm Indications (RAIs);

(4) Remote Alarm Indications-Customer Installation (RAI-CI);

(5) Performance Report Messages (PRMs) (if the received signal is in Extended Superframe Format (ESF) with PRMs); and (6) Supplementary Performance Report Messages (SPRMs), (if a Remote Module is present in the path between the CPE and the test and monitoring equipment).

In addition, the test and monitor device of the preferred embodiment of the present invention is fully ANSI compatible (i.e., is capable of monitoring each of the performance primatives and parameters defined by ANSI T1.231 paragraph 6, et seq.). The present invention processes this information in order to determine the point of origin of any Event, such as an "Errored Second" or an alarm which is detected at the test and monitor device. In an alternative embodiment of the present invention, any subset or super set of these parameters and primatives may be monitored by the test and monitor device.

The information that is received is processed in a three step process in order to generate a "Sectionalizer Report". The Sectionalizer Report can be output as a graphical display on a video output device (such as a video monitor), or the data can be transmitted to a remote device, such as an Operations System (OS) over an asynchronous or X.25 communication channel. The Sectionalizer Report can be structured in accordance with one of three modes ("Filtered Mode", "History Mode", and "Current Mode") and two views ("Data View" and "Sectionalized View").

In the first step in preparing the Sectionalizer Report, a first filter captures changes in the status of each leg in the path (as determined by the occurrence of an Event). Indications that an Event has occurred are derived from the information received by the test and monitor device ("Raw Data"), and are output from the first filter only after a first predetermined period of time has elapsed or upon detection of a more severe Event. Each detected Event is held within the first filter for a second predetermined period which is longer than the first predetermined period. Accordingly, any Event that occurs will be output from the first filter before the indication of that Event is cleared. If more than one Event is detected on a particular leg in the path, then the most severe Event is output from the first filter after the first period of time has elapsed, the first period of time beginning at the time the most severe Event was detected. If the Event is no longer being detected after the second period of time has elapsed, then the Event is cleared and will not be reported in subsequent reports.

In a second step in preparing the Sectionalizer Report, a second filter "smooths" changes in the status of each leg in the path. That is, the second filter imposes a delay before indications of Events in each leg of the path, unless the severity of the Event is decreased. By imposing such a delay, the output is stabilized and Events that are reported at different times from different devices due to lack of synchronization between the time reports are generated by different devices in the data path and reported in a manner which ensures that such Events are not processed as two separate Events.

In a third step in preparing the Sectionalizer Report, the information output from the second filter is used to determine where particular Events originated. Signals transmitted in each direction (i.e., to the network and from the network) are handled independently. However, if the signal reporting an Event on the signal from the network (i.e., an RAI signal) disrupts the signal being transmitted to the network (such as occurs in some instances in signals formatted in accordance with SF format), then the ability to detect Events on the signal to the network is limited. By implementing a sectionalizing method in which conditions are noted which, if present, are clear indications that a particular section of the data path is responsible for an Event, the possibilities are narrowed such that a determination can be made as to which section the Event originated within.

Operation of the sectionalizer function of the present invention may be enhanced by use of network interface units located at the point of demarcation between the LEC and the CPE which provide additional diagnostic information to the test and monitor equipment, However, such network interface units are not necessary.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWING

The objects, advantages, and features of this invention will become readily apparent in view of the following description, when read in conjunction with the accompanying drawing, in which.

Like reference numbers and designations in the various drawings refer to like elements.

DETAILED DESCRIPTION OF THE INVENTION

Throughout this description, the preferred embodiment and examples shown should be considered as exemplars, rather than limitations on the present invention.

Overview

The present invention is a system in which a network interface unit (hereinafter referred to as a "Remote Module") is combined with a test and performance monitoring device to provide a means by which the origin of "Events" which occur can be determined (i.e., the data path can be sectionalized). Initially, the operation of the Remote Module is described, followed by a description of the method and apparatus used to sectionalize the data path.

Remote Module

Figure 1:
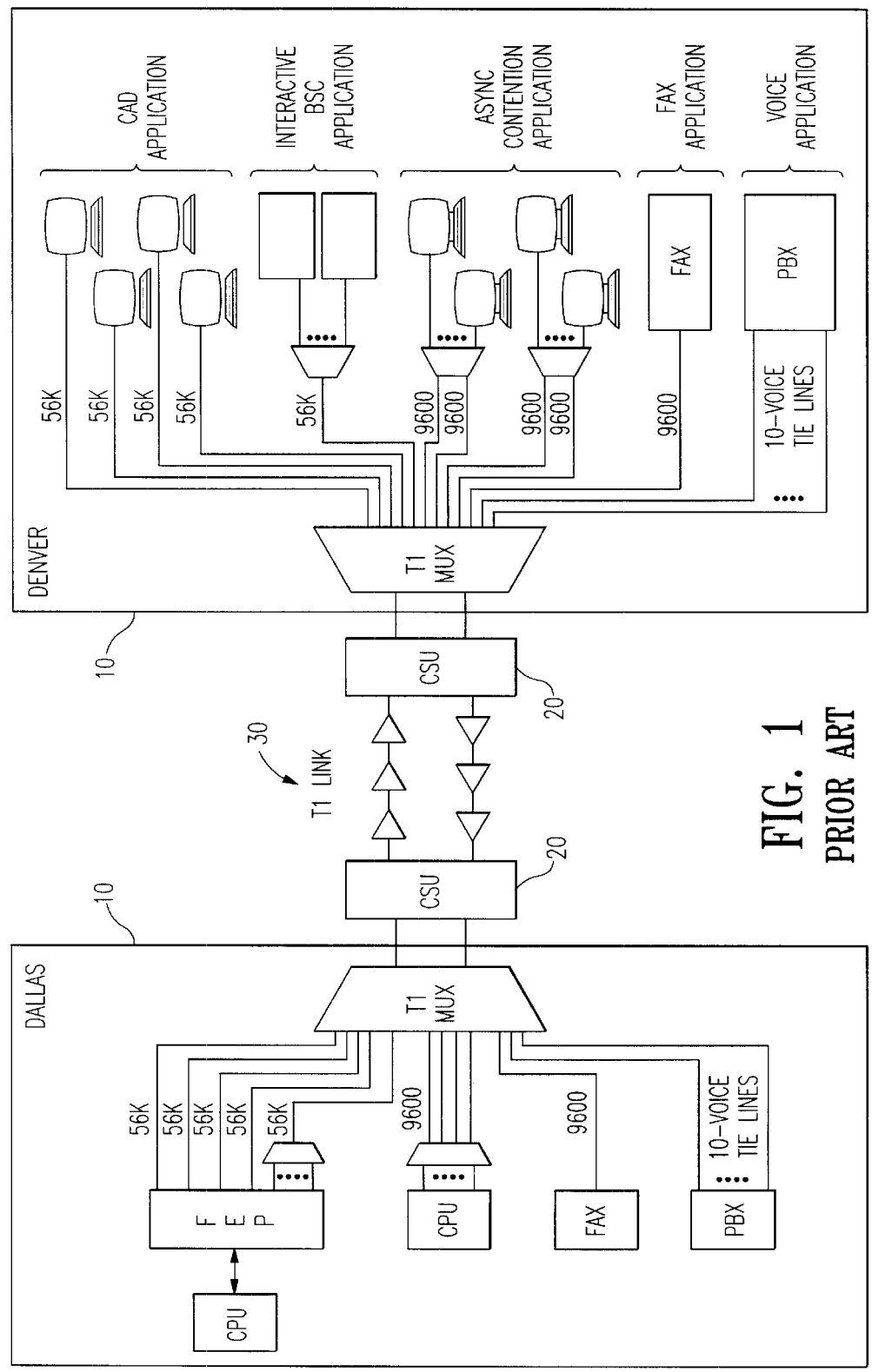
FIG. 1 is a block diagram of a relatively simple private DS1 digital communications network.
Figure 2A:
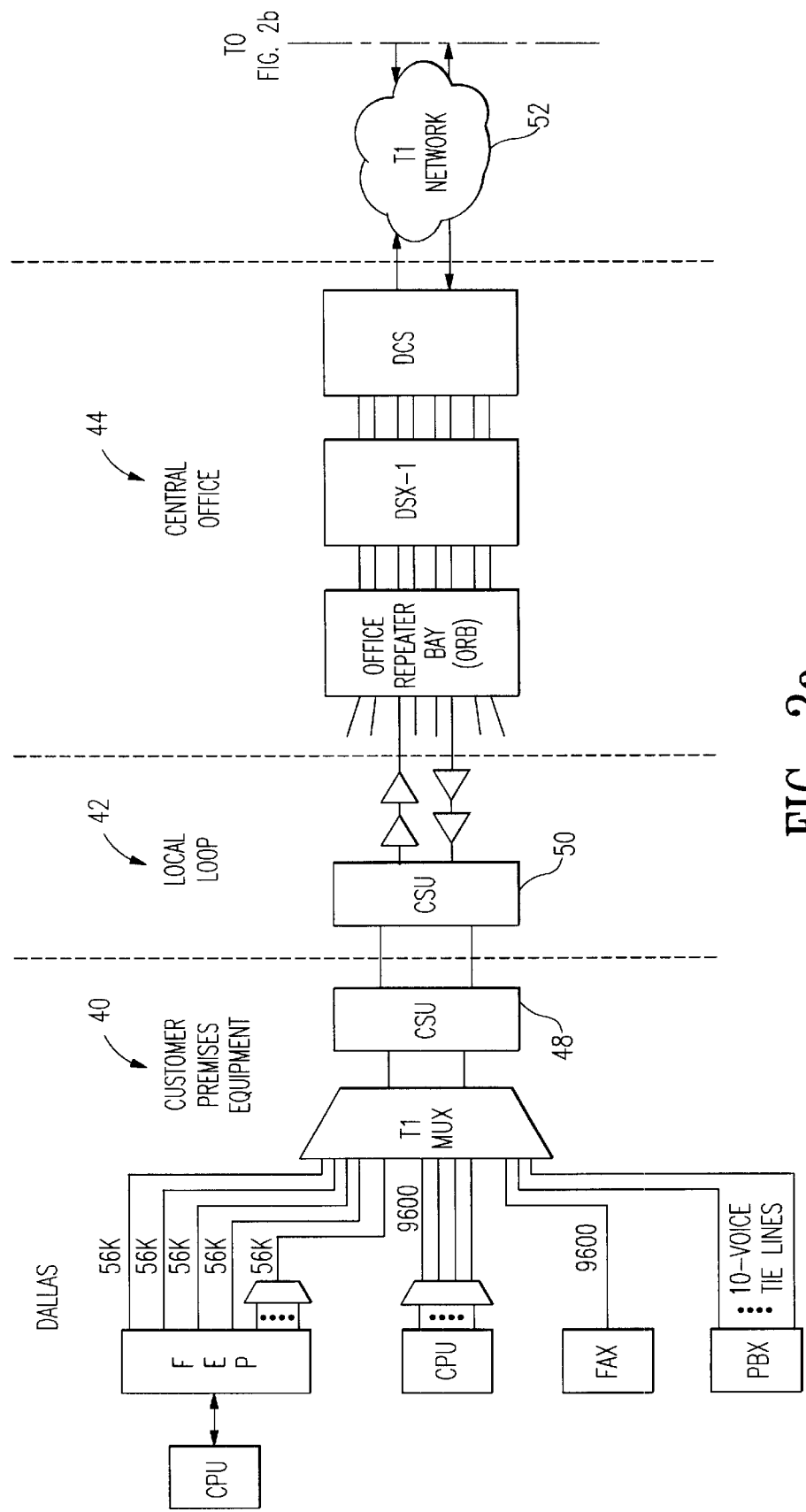
FIG. 2 is a block diagram of a complex public DS1 communications network.
Figure 2B:
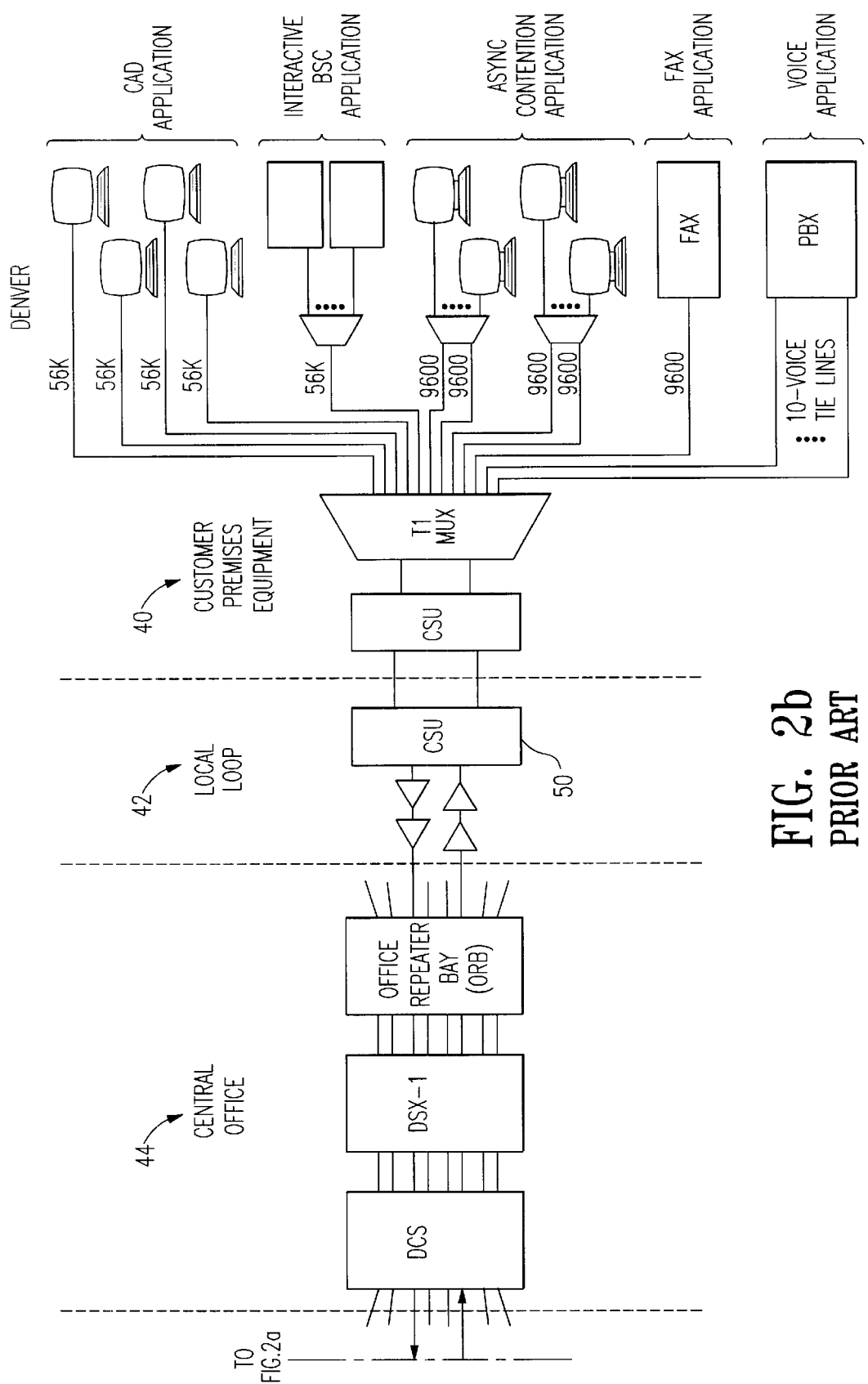
Figure 3A:
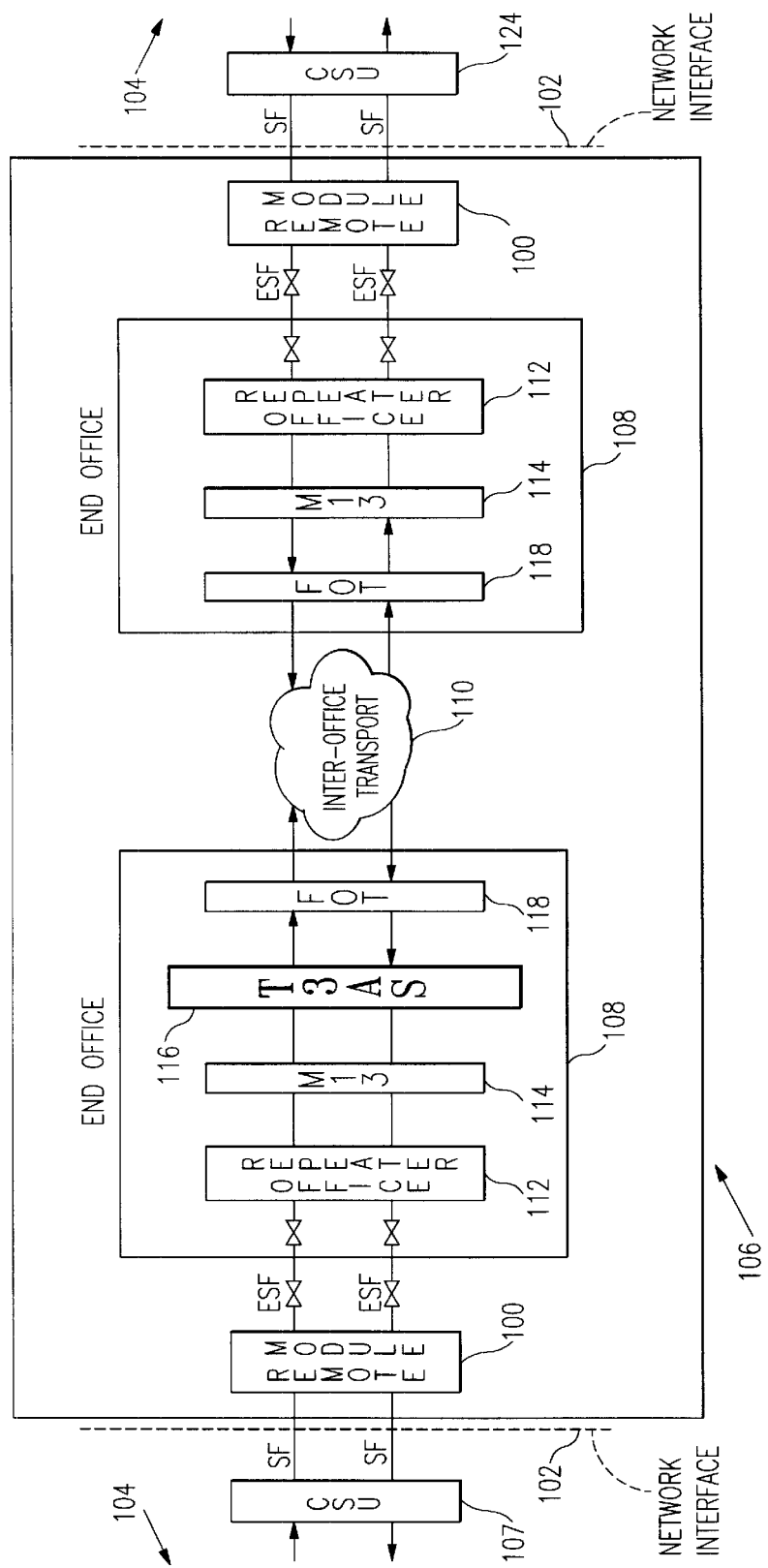
FIG. 3a is a block diagram of a public DS1 path employing the Remote Module of the present invention.

FIG. 3a shows a public DS1 network employing an inventive network interface unit 100 (hereinafter referred to as a "Remote Module") in accordance with the present invention. As shown in FIG. 3a, the Remote Module 100 is preferably placed at the point of demarcation (network interface) 102 between the customer premises equipment (CPE) 104 and the telephone network 106. In one embodiment shown in FIG. 3a, the telephone network 106 includes two end offices 108 and an inter-office transport 110. The CPE 104 comprises a channel service unit (CSU) 107. The end offices 108 include an office repeater 112, an M13 block 114, a test and performance monitoring equipment block 116, and a fiber optic terminal (FOT) interface 118. The office repeater 112 is passive to the DS1 digital signal for transmission to the Remote Module 100. The multiplexer portion of an M13 block 114 accepts 28 DS1 signals which may or may not be operating asynchronously and multiplexes them into a single DS3 signal using the DS2 level of the North American hierarchy as an intermediate step. The demultiplexer portion of the M13 block 114 reverses the process, dismantling the DS3 signal into its 28 constituent DS1s. The test and performance monitoring equipment block 116 monitors the data transmitted between the two Remote Modules 100. The inter-office transport 110 may include one or a plurality of fiber optic links, line of sight microwave link, or any other transport means. In these cases, the FOT 118 may be replaced with an appropriate transport interface.

The Remote Module 100 combines, in a compact and an inexpensive unit, the CPE-to-telephone network interface, controlled circuit loop-back, frame format conversion, and CPE loss of signal (LOS) identification functions. The Remote Module 100 provides three major features which enhance the performance monitoring and testing capability of the network providers.

First, the Remote Module 100 can optionally convert the CPE generated Superframe (SF) formatted digital signals into Extended Superframe (ESF) formatted signals for transmission over the DS1 transmission system. Frame format conversion allows the local exchange carriers (LECs) to conform their networks to the superior ANSI T1.403 ESF frame format ("ESF frame format"). The ESF frame format permits "Performance Report Messages" (PRMs) to be transmitted together with digital data over the DS1 transmission system. In addition, the ESF frame format enables the LECs to perform non-intrusive, continuous performance monitoring of both the CPE 104 and the telephone network 106.

Figure 3B:
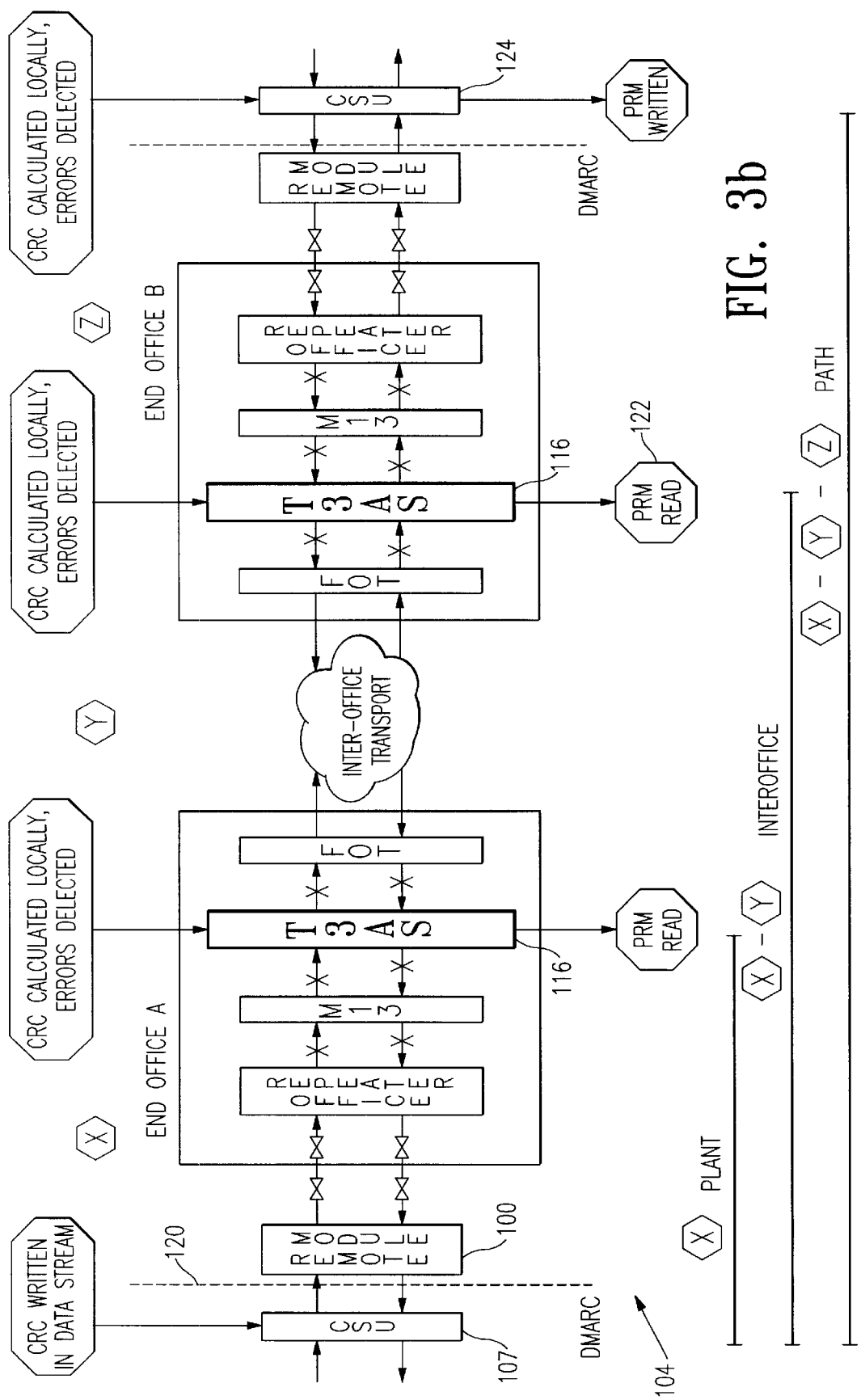
FIG. 3b shows how the present invention is used in a public DS1 path to enhance the sectionalization capability of existing DS1 networks.

Second, the present invention is capable of performance monitoring using the ANSI T1.403 ESF Data Link (DL). Cyclic Redundancy Codes (CRCs) and other performance monitoring data can be generated at one end of a DS1 transmission system and periodically (i.e., preferably once per second) transmitted back to some other point in the system in a non-intrusive manner using the DL. For example, as shown in FIG. 3b, a CRC code may be written into the data stream via the CSU 107. Errors can be detected by the Remote Module 100 and transmitted in PRMs in an ESF-converted digital signal. The PRMs can then be read by network elements located throughout the DS1 transmission system. For example, the PRMs may be read by the test and performance monitoring block 116. Alternatively, the PRMs may be transmitted throughout the network using the ESF format and may therefore be made available to local users or Operations Systems (OSs). As shown in FIG. 3b, the test and performance monitoring block 116 serves as a central hub for collecting performance monitoring data which is transmitted as ESF-formatted DS1 digital signals. In alternative embodiments of the DS1 transmission system shown in FIG. 3b, the test and performance monitoring block 116 is modified to screen and analyze performance monitoring data which is generated by the Remote Modules 100 in accordance with the present invention. In this alternative embodiment, the test and performance monitoring block 116 functions as a mediation device for the Operations Systems.

Third, the present invention increases the value and utility of the test and performance monitoring blocks 116 currently in use in intra-LATA (Local Access and Transport Areas) circuits by enhancing the sectionalization capability of existing DS1 transmission systems. The sectionalization function performed by the test and performance monitoring blocks 116 on the intra-LATA circuits is shown in FIGS. 3a and 3b. The Remote Module 100 enables the test and performance monitoring blocks 116 to non-intrusively sectionalize problems occurring within the DS1 transmission system on intra-LATA circuits, and thereby greatly enhances troubleshooting capability. The Remote Module 100 allows the LECs to sectionalize trouble by allowing the PRMs which are generated by the Remote Module 100 to be read at several different locations throughout the DS1 transmission system. By monitoring the difference in error counts at various locations within the network, at which performance monitoring information is collected, troubled network elements can be quickly and efficiently isolated to specific sections within the DS1 transmission system.

In addition, the Remote Module 100 is capable of determining whether signals that are received from the network are in an alarm condition (AIS, LOS, or LOF is present on the signal received by the Remote Module from the network). If the signal received by the Remote Module 100 from the network is not in alarm, but the Remote Module 100 is receiving an RAI indication from the CSU 107, then the Remote Module 100 modifies the RAI signal received from the CSU 107 to indicate that the alarm condition is due to an Event that has occurred within the customer installation (i.e., between the Remote Module 100 and the CSU 107). The Remote Module 100 also generates an AIS-CI signal to indicate that a condition which would cause an AIS signal to be generated exists on the signal received by the Remote Module 100 from the CSU 107 (i.e., that an alarm condition exists on the signal received by the network from the CPE). Thus, equipment located downstream (such as the test and performance monitoring equipment 116) can determine where an alarm originated.

By either converting the CPE-generated signals into an ESF format, or modifying ESF signals to provide additional information, the LECs can monitor the various facilities that make up an end-to-end DS1 transmission system. Therefore, when customers complain about degraded or unavailable circuits, the network provider can use the ESF format to locate the faulty equipment in a real-time, non-intrusive manner. For example, and referring now to FIG. 3b, if the CRC codes generated by the customer's CSU 107 were monitored at a position 120, and found to contain 20 error events, the CSU 107, 124 or other customer owned equipment would be deemed to be responsible for the errors. If at a position 122 the same data now contained 30 error events, the network provider would be deemed to be responsible for 10 of the 30 error events. When the CRCs arrive at the far-end CSU 124, they are checked by the customer's CSU 124. If the data still contains 30 error events from end-to-end, then the network from 122 is deemed to have been error free because there is no change from the number of error events detected at position 122. The same principle may be used in the reverse direction. Thus, the Remote Module 100, in accordance with the present invention, solves a regulatory and jurisdictional problem for the telephone network providers. That is, LECs are responsible for providing quality of service but have no control over or right to specify a CPE format which would enable them to monitor quality of service.

The ESF format also provides network providers the ability to proactively monitor networks for "bad" or marginally bad facilities and to fix internal problems before customers notice a degradation in service. This capability moves the network providers closer to offering a "self-healing" network to their customers. From a customer's perspective, an ESF-converted network, facilitated by the Remote Module 100 of the present invention, advantageously increases the availability of the network, increases efficiency and decreases the down-time associated with the prior art network interface units.

The Remote Modules 100 of the present invention, e.g., shown in FIG. 3a, are transparent to the CPE 104. Signals are re-converted into their original format before being transmitted to the CPE 104. The Remote Modules 100 are preferably compatible with all commonly used DS1 formats. Frame format conversion and the addition of a DL maintenance channel do not adversely affect customer payload data. For example, if the CPE 104 generates an SF-formatted digital DS1 signal, the DS1 signal is converted into an ESF-formatted signal for transmission over the network 106. Conversely, ESF-formatted digital DS1 signals are converted by the Remote Modules 100 to SF-formatted signals when the CPE 104 operates using that format.

Detailed Discussion of the Remote Module

Figure 4:
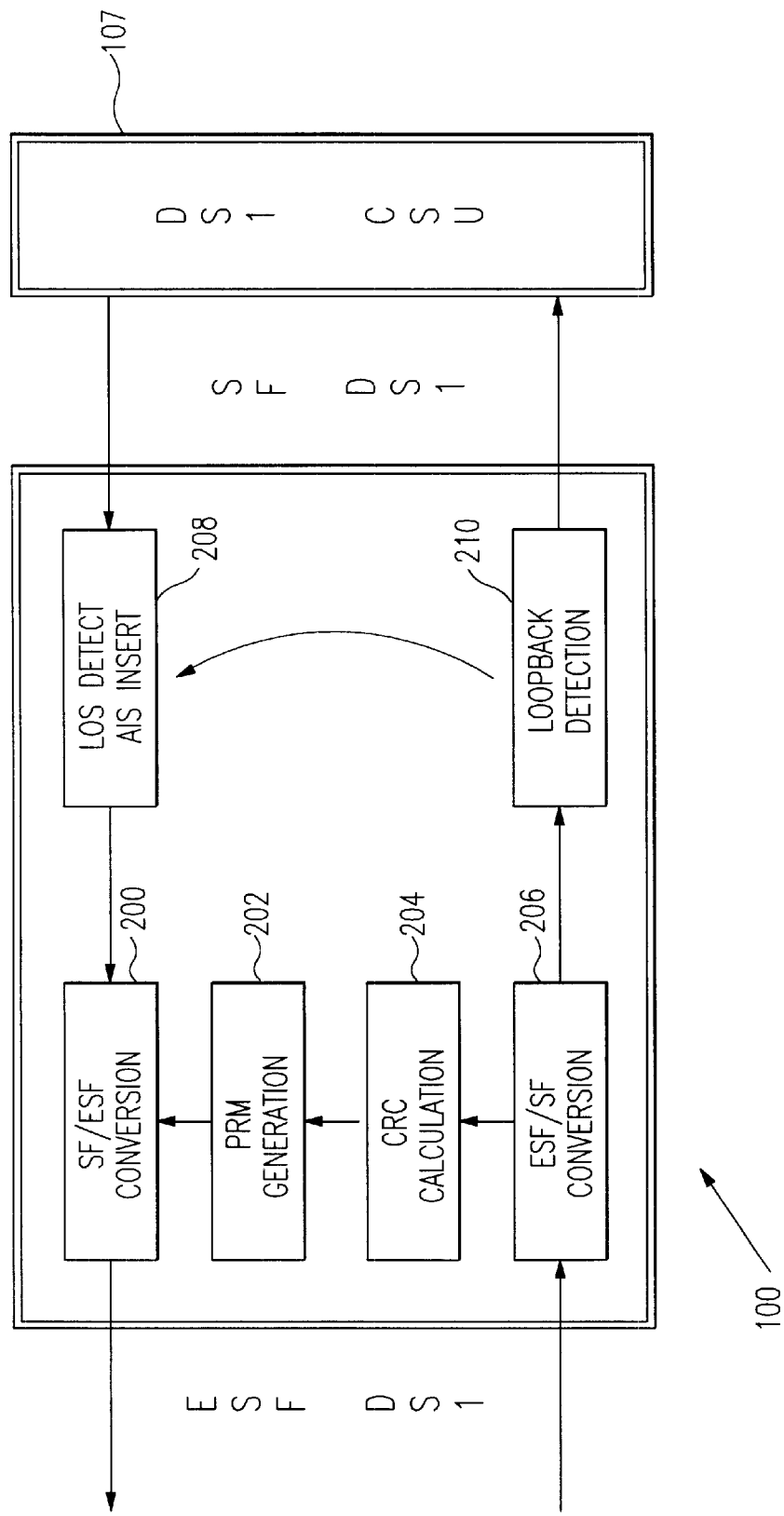
FIG. 4 is a functional block diagram of the Remote Module of FIGS. 3a and 3b.

FIG. 4 shows a block diagram of the Remote Module 100 of FIGS. 3a and 3b. As shown in FIG. 4, the Remote Module 100 includes an SF-to-ESF frame format converter 200, a PRM generator 202, a CRC block 204, an ESF-to-SF frame format converter 206, a LOS detector and AIS insertion block 208, and a loop-back detection block 210. As described above, the frame formats used to transmit the DS1 signals are selected by the end users and are typically determined by the type of CSU 107 used by the end users.

New model CSUs typically provide users with an option for selecting between the SF and ESF frame formats. However, most of the CSUs currently in use provide only the SF frame format. The SF-to-ESF converter block 200 of the Remote Module 100 changes the superframe (SF) formatted signal (having only 12 frames) to an extended superframe signal (ESF) having 24 frames, each frame having 193 bits of data. In both the SF and ESF frame formats, the 1st bit of each frame is used as an overhead bit.

The SF and ESF frame formats have 8 kb/s of overhead capacity. In the ESF frame format, the overhead capacity per extended superframe are divided into three independent channels having capacities as indicated below:

fps (framing): 2 kb/s

CRC (error checking): 2 kb/s

DL (data link): 4 kb/s

An fps pattern is repeated on a per extended superframe basis. The CRC is also repeated on a per extended superframe basis. However, a polynomial remainder carried by the CRC bits results from a polynomial division carried out over the payload bits of the previous extended superframe. Although the fps and CRC bits repeat in patterns which are synchronous with, and fully contained within, the boundaries of an extended superframe, such is not the case with the DL. The three types of patterns carried by the DL have lengths as follows:

HDLC flags (idle code): 8 bits unscheduled message: 16 bits scheduled message (PRM without stuffing): 104 bits.

The DL provides 12 bits per superframe. It is not possible to align any of the possible DL patterns exactly on extended superframe boundaries and all of them overlie extended superframe boundaries in most instances. The overhead capacity of an ESF formatted DS1 signal therefore is occupied by three separate and distinct signals.

When converting from the SF to the ESF frame format, the SF-to-ESF converter 200 generates the frame, signal management, and CRC overhead bits in accordance with the provisions of AT&T PUB 54016 and ANSI T1.403. The Remote Module 100 implements the ANSI T1.403 DL protocol, which allows performance report messages to be transmitted between the Remote Module 100 and another element in the telephone network 106.

The SF-to-ESF converter 200 and the ESF-to-SF converter 206 provide the Remote Module 100 with the ability to make use of an unused customer DL with SF and ESF-formatted signals not in ANSI T1.403 ESF format. The Remote Module 100 converts such a DL into the ANSI T1.403 ESF format by adding PRMs to the unused DL. Therefore, the conversion blocks 200, 206, allow the LEC to operate its network in the ANSI T1.403 ESF format regardless of the framing format used by the CPE. For example, if the customer's CSU 107, 124 uses the ANSI T1.403 ESF frame format, the Remote Module 100 does not alter the frame format for transmission to the telephone network 106. However, if the customer's CSU 107,124 uses the SF or anon-ANSI T1.403 format, the Remote Module 100, and more specifically the converter blocks 200, 206, convert the unused customer DL to the ANSI T1.403 ESF frame format by adding PRMs. The ANSI T1.403 ESF-formatted signal is transmitted by the Remote Module 100. The ESF-to-SF conversion block 206 converts the ESF formatted DS1 signal into the SF format used by the CSUs 107, 124.

The Remote Module implements a protocol which prevents its PRMs from interfering with the transmission of AT&T PUB 54016 data if such data is present in the DL. The Remote Module momentarily delays PUB 54016 polls and responses and releases them in an uncorrupted manner.

The conversion blocks 200,206 function differently depending upon the specific version of the ESF DS1 format used by the CSUs 107, 124. For example, when the CSUs 107, 124 use the ESF format without PRMs, CRC calculations are performed on the signal as it is transmitted to the CSUs 107, 124. The PRMs are written into the signal transmitted by the CSUs 107, 124 in the same manner as they would normally be written by the CSUs 107, 124 if the CSU 107, 124 were operating in conformance with the ANSI T1.403 ESF standard. When the CSUs 107, 124 use the ESF with AT&T PUB 54016 data, the CRC calculations are performed on the signal in the direction of transmission toward the CPE 104 (i.e., toward CSU 107). In this case, the PRMs are written into the signal as it is transmitted toward the telephone network 106. When the CSUs 107, 124 are interrogated by a network element (via a facilities data link), PUB 54016 messages are momentarily delayed within the Remote Module 100 so as to avoid collision with T1.403 messages. At most, PUB 54016 data is delayed for no longer than 20 milliseconds. The SF-to-ESF converter block 200 and the ESF-to-SF converter block 206 inhibit the insertion of the PRMs until the AT&T PUB 54016 Performance Report is transmitted back to the network. If the CSUs 107, 124 use an ANSI T1.403 ESF format (PRMs present), the converter blocks 200, 206 simply pass the signals transparently in both directions of transmission.

Figure 5:
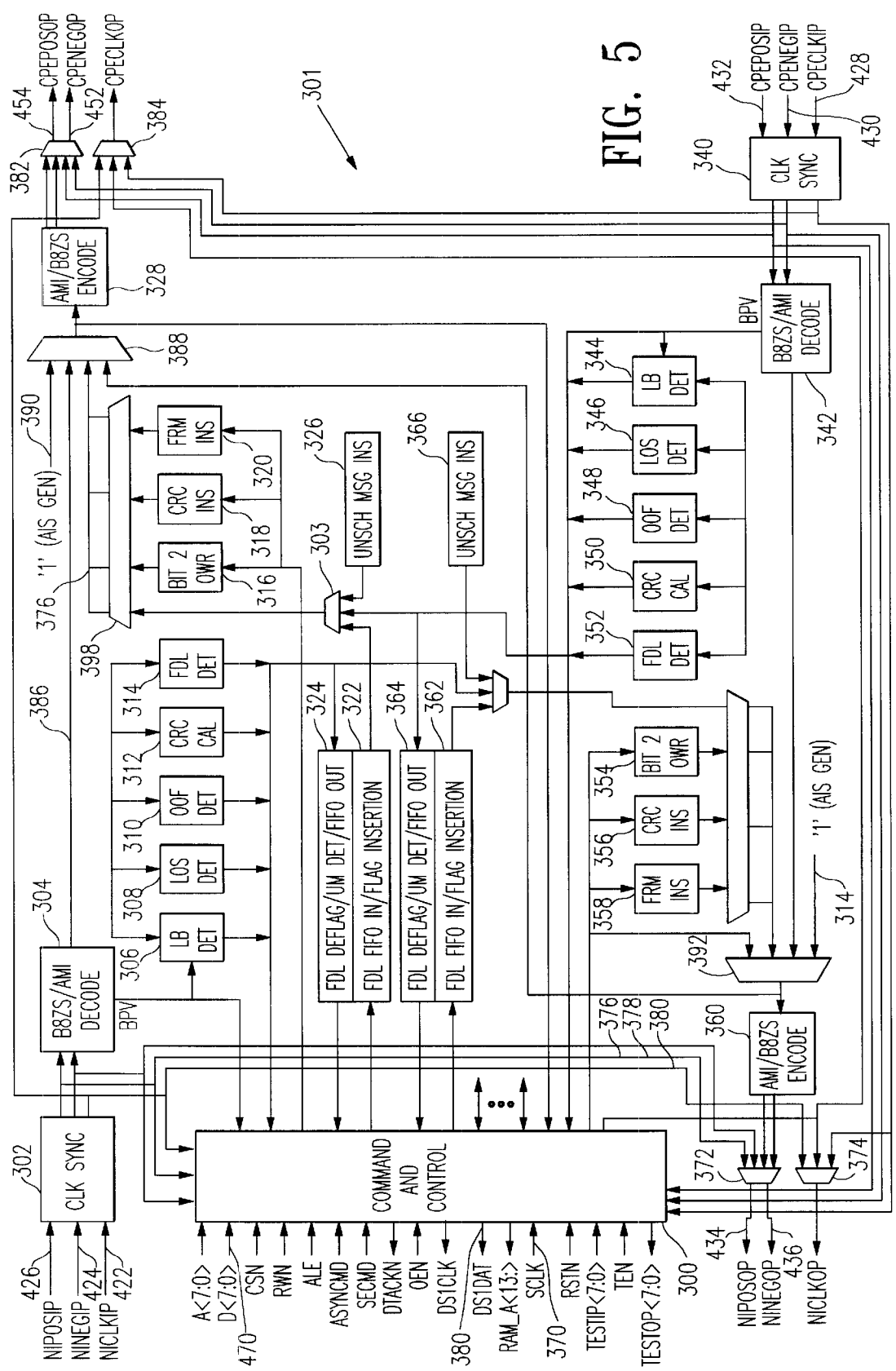
FIG. 5 is a detailed block diagram of an integrated circuit which implements many of the key functions provided by the present invention.

FIG. 5 shows a block diagram of an application specific integrated circuit (ASIC) 301 which implements many of the functions of the Remote Module 100 of FIGS. 3a, 3b, and 4. The ASIC 301 of FIG. 5 may generally be broken down into two halves: a top (receive) half used to accept network signals as input and generate signals to the customer premises equipment on output, and a bottom (transmit) half which accepts digital signals from the customer premises equipment and generates signals for transmission over the network. The receive half (i.e., network-to-CPE) includes a clock synchronizer (CLK SYNC) 302, a B8ZS/AMI decode block 304, an LB detector block 306, an LOS detector block 308, an Out-Of-Frame (OOF) detector block 310, a CRC calculation block 312, a DL detector block 314, a bit 2 overwrite (OR) block 316, a CRC insertion block 318, a frame (FRM) insertion block 320, a DL input FIFO 322, a DL output FIFO 324, a UNSCH MSG INS block 326, and an AMI/B8ZS encode block 328. The transmit half (i.e., CPE-to-network) of the ASIC 301 includes a clock synchronizer (CLK SYNC) block 340, a B8ZS/AMI decode block 342, an LB detector block 344, an LOS detector 346, an Out-Of-Frame (OOF) detector 348, a CRC calculation block 350, a DL detector block 352, a bit 2 overwrite (OR) block 354, a CRC insertion block 356, an FRM INS block 358, an AMI/B8ZS encode block 360, a DL input FIFO 362, a DL output FIFO 364, and an UNSCH MSG INS block 366. Both the receive (network-to-CPE) and the transmit (CPE-to-network) halves of the ASIC 301 are controlled by a command and control block 300.

All processing of data within the Remote Module 100 is synchronized to the Remote Module master clock SCLK 370. However, the data received from the network 106 and the customer premises equipment is independently clocked and synchronized to their associated DS1 incoming clocks by the clock synchronizing blocks 302 and 340. The FIFOs 322, 324, 362, and 364, facilitate the transfer of data between the telephone network 106 and the customer through-paths and the portions of the Remote Module 100 which are synchronous to the SCLK 370.

The key functions provided by the ASIC 301 of FIG. 5 include the ability to perform loop-back functions, LOS detection via the LOS detector blocks 308, 346, AIS generation, frame format conversion, and performance monitoring functions. These key functions are performed by the present Remote Module 100 on both the input and output signals (i.e., the signal received from the telephone network 106 by the CPE 104 and the signal transmitted by the CPE 104 to the telephone network 106).

Performance monitoring on both the telephone network 106 and customer signals generated by the CPE 104 includes conventional LOS detection, Bipolar Violation detection, frame bit error (FBE) and CRC error detection. In addition, the Remote Module 100 has the ability to overwrite data which is transmitted from the telephone network 106 to the customer's CPE 104. The Remote Module 100 preferably can overwrite both the frame bit (FB) and the AIS. Similarly, the Remote Module 100 can overwrite data transmitted by the customer's CPE 104 to the telephone network 106. For example, the Remote Module 100 can overwrite the FB, CRC, DL/PRM, RAI (standard and non-standard versions), RAI alternative ("bit 2 overwrite") and AIS bits. The symmetrical performance monitoring and overwrite capability on both the CPE-to-network and network-to-CPE data streams enhances the usefulness of the Remote Module 100 for potential future applications.

Referring to FIG. 5, the LOS detector blocks 308, 346, enable the Remote Module 100 to detect a loss of signal from both the telephone network 106 and the CPE 104. The LOS detector 308 treats a loss of signal received from the telephone network 106 conventionally by sending an AIS to the CPE 104. RAI signals or another signal which is compatible with existing standards, are preferably used to signal upstream equipment in the telephone network 106 of a loss of signal.

Advantageously, the present Remote Module 100 processes a loss of signal received from the CPE 104 using an AIS or other similar signal to indicate that the CPE 104 is disconnected from the telephone network 106 or is out-of-service. In addition, as described in more detail below, the present invention preferably generates a variant of the AIS signal (referred to as AIS-CL) to indicate that the alarm originated within the CPE.

The AIS or other similar signal advantageously provides LEC maintenance personnel the ability to filter alarms originating from outside the telephone network 106. The Remote Module 100, and more specifically, the LOS Detector Blocks 308, 346, preferably determines the occurrence of an LOS based solely upon logic values detected in the incoming bit stream. Power and amplitude of the incoming signals are preferably not used for LOS detection.

Upon detection of an LOS from the network signals, the Remote Module 100 relays an RAI signal generated by the CSU 107 to the network. If the CSU is operating in SF format, Remote Module 100 is not converting the signal to ESF format, and the Remote Module 100 is configured to route the RAI signal, the RAI is preferably indicated by forcing "bit 2" of each channel byte to a logic 0 value for a period of not less than 1 second duration. Alternatively, if either the CSU 107 is operating in ESF format or a conversion to ESF format is performed by the Remote Module 100, the RAI is sent as an unscheduled DL message in accordance with ANSI T1.403. In addition, the Remote Module 100 is preferably capable of modifying a received RAI signal to indicate that the RAI was due to a loss of signal within the CPE (between the Remote Module 100 and the CSU 107). That is, upon detecting that the signal received by the Remote Module 100 from the network is not in alarm condition, the Remote Module determines that receipt of an RAI from the CSU 107 indicates that the signal was lost within the CPE and generates an RAI-CI signal. Details regarding the RAI-CI signal are provided below.

The command and control block 300 of FIG. 5, together with a control microprocessor 400 (shown in FIG. 6) performs the ESF-to-SF and SF-to-ESF conversion functions as shown in the conversion blocks 200, 206, of FIG. 4. Control software is executed by both the command and control block 300 and the microprocessor 400. The control software controls the conversion of the CPE-generated frame format to an ESF format. Upon receipt of frames from the network, the command and control block 300 and the microprocessor 400 preferably convert the frame structure transmitted from the network to the Remote Module back to an SF format without altering the payload data bits before transmitting the frame to the CPE. The microprocessor configures the ASIC. The control block stores configuration information for the ASIC and reports status and error counts back to the microprocessor. In order for the Remote Module 100 to transmit performance monitoring data to the network, transmission capacity is borrowed from the overhead channel present in the DS1 digital signal. The Remote Module 100 uses the 4 Kb/s DL channel present in the ESF-formatted signals to transmit performance monitoring reports to other equipment in the DS1 transmission system. Preferably, an element in the network (a test and performance monitoring block 116 or other network element) reads and analyzes the performance monitoring data gathered by the Remote Module 100. In the preferred embodiment of the present invention, Bipolar Violations are transferred transparently through the Remote Module 100 in both directions. When the Remote Module 100 performs frame format conversion, and an incoming Bipolar Violation is detected in an overhead bit position, it is written by the Remote Module 100 into the identical overhead bit position, unless the logic value carried by that bit position is changed from a logical 1 to a 0 by the frame format conversion method performed by the present invention. When the overhead bit position is changed from a logical 1 to a 0 due to the frame format conversion performed by the Remote Module 100, no outgoing Bipolar Violation is written into the data stream. This algorithm ensures that outgoing Bipolar Violations closely correspond to incoming Bipolar Violations.

If the command and control block 300 detects a loss of frame on an incoming signal, the command and control block 300 inhibits frame format conversion until the Remote Module 100 reframes the input signal. Reframing is known and is performed under software control. Inhibiting frame conversion prevents interference with the transmission of unframed maintenance signals and fault locate codes.

Data Flow Through the Remote Module

Figure 6A:
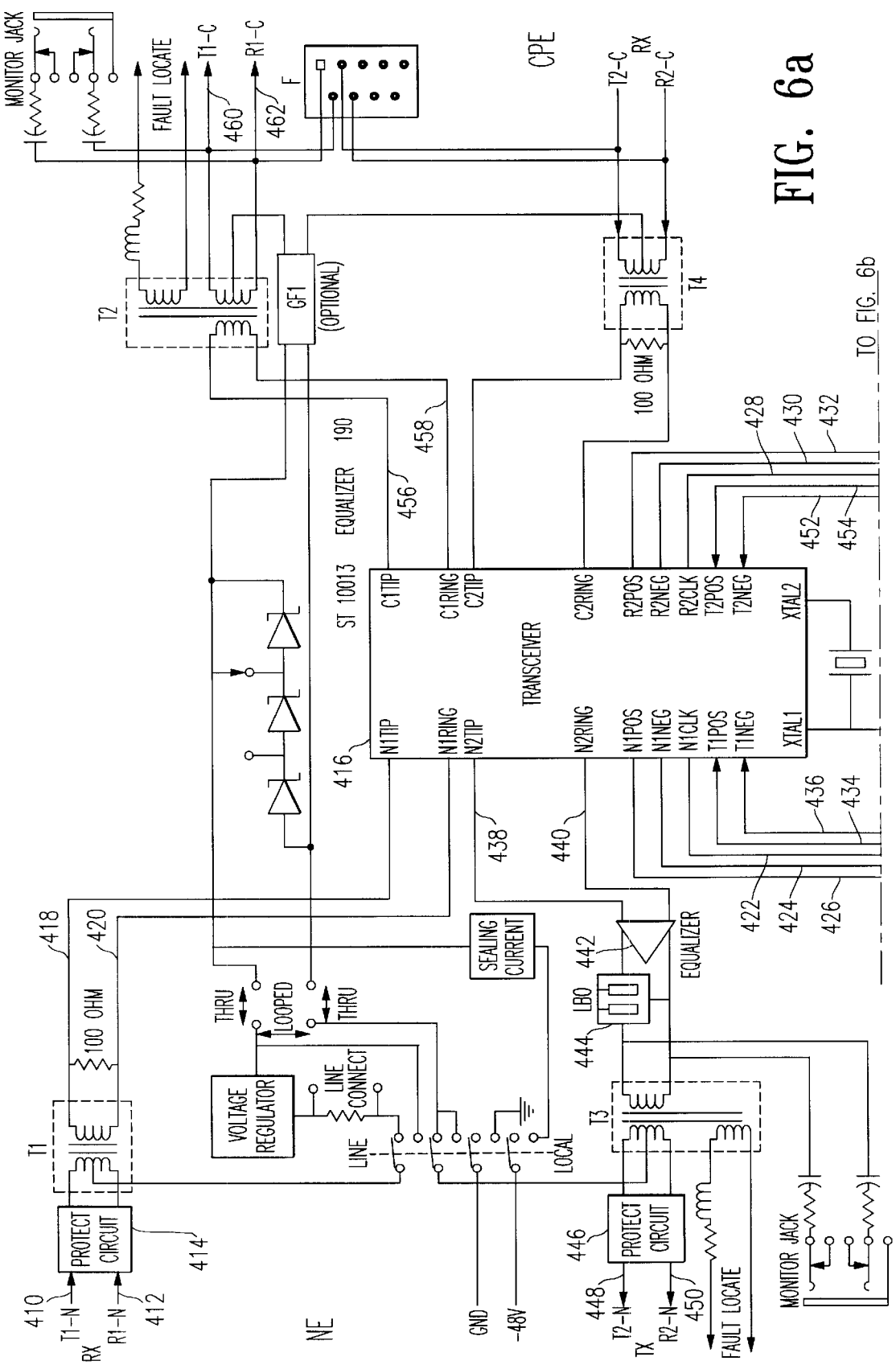
FIG. 6 is a schematic of the Remote Module of FIG. 4 using the integrated circuit of FIG. 5.
Figure 6B:
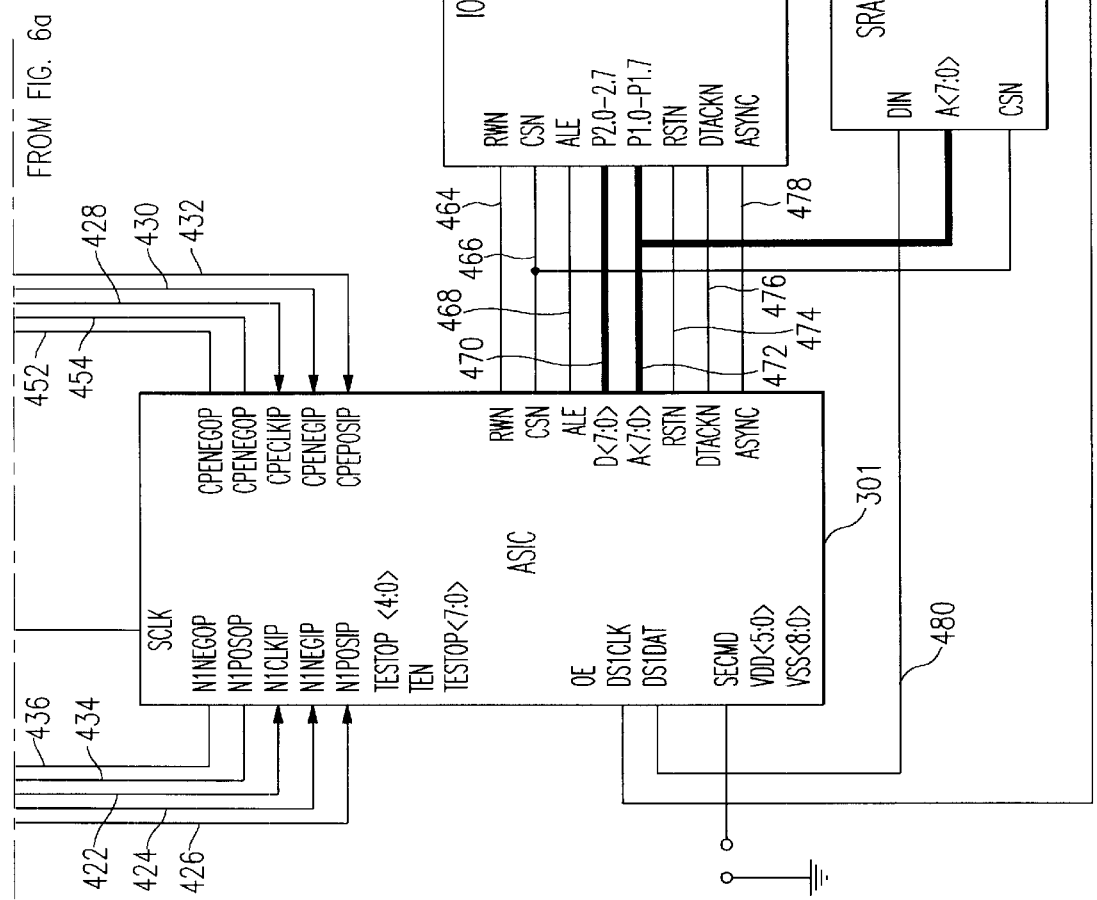

Referring simultaneously to FIGS. 5 and 6, bipolar signals are received from the network over the "tip-1" 410 and "ring-1" 412 receive lines. After transmission through a receive protection circuit 414, the bipolar signals are transmitted to a transceiver 416 over the N1TIP 418 and N1RING 420 signal lines. The transceiver 416 converts the bipolar signals to unipolar signals which are comprised of 2 dual-rail signals (1 positive rail and 1 negative rail) and a clock. Specifically, the transceiver 416 converts the bipolar signals received from the N1TIP 418 and N1RING 420 signal lines into unipolar signals and transmits the unipolar signals over 3 network-receive data lines: N1CLKIP 422, N1NEGIP 424, and N1POSIP 426. The transceiver 416 similarly converts the bipolar signals generated by the CPE and received at T2-C 486 and R2-C 488 into unipolar signals and transmits the unipolar signals over 3 CPE-receive data lines: CPE-CLKIP 428, CPENEGIP 430, and CPEPOSIP 432. In the illustrated embodiment, the 6 receive data lines communicate with the ASIC 301 which is shown in more detail in FIG. 5.

Data is output by the ASIC 301 to the CPE 40 and the network through the conventional transceiver 416, such as ST10013 manufactured by Level One. For example, 2 unipolar output signals are transmitted by the ASIC 301 over 2 data lines N1POSOP 434 and N1NEGOP 436. The transceiver 416 converts the 2 unipolar signals into 2 bipolar signals for transmission over the bipolar signal lines N2TIP 438 AND N2RING 440. The bipolar signals are transmitted through an equalizer 442, a line build-out switch 444, a protection circuit 446, and to the network over "tip-2" 448 and "ring-2" 450 transmit lines. The transceiver 416 similarly converts 2 unipolar signals generated by the ASIC 301 (CPENEGOP 452 and CPEPOSOP 454) into bipolar signals and transmits the bipolar signals over 2 CPE-transmit signal lines: C1TIP 456 and C1RING 459. The bipolar signals are transmitted to the CPE over T1-C 460 and R1-C 462 tip and ring lines.

The ASIC 301 and the microprocessor 400 communicate with each other over a read/write control line 464, a chip select (CS) control line 466, an address latch enable (ALE) control line 468, an 8-bit data bus 470, an address bus 472, an RSTN control line 474, a DTACK control line 476, and an ASYNC control line 478. As shown in FIG. 6, the microprocessor 400 and the ASIC 301 have access to a static random access memory (SRAM) 402 via shared address and control lines. The SRAM 402 is preferably implemented with a 16 k×1 device. Data is output by the ASIC 301 over a DS1DAT data line 480. The microprocessor 400 accesses data which is stored in the SRAM 402 by addressing the desired memory location (using the address bus 472), asserting the CSN line 468 low, and asserting a read control signal 482 high (i.e., to a logical "1").

The data stored at the memory location present on the address bus 472 is output by the SRAM 402 on data output lines 484. The microprocessor 400 and the ASIC 301 work together to implement the functions provided by the present invention. In one embodiment of the present invention, the microprocessor 400 is generally responsible for ensuring that the T1 frames are properly aligned after frame format conversion. In addition, the microcontroller 400 monitors the PRMs. Still further, the microcontroller 400 monitors status of manual switches and illuminates indicators, such as LED displays.

Referring again to FIG. 5, the data flow through the ASIC 301 is now described in more detail. The data received from the network enters the ASIC 301 on data lines N1POSIP 426 and N1NEGIP 424. The received data is registered with the received clock N1CLKIP 422. The CLK SYNC block 302 synchronizes the data to a master clock SCLK. The output of the CLK SYNC block 302 is routed to the command and control block 300, a 2-to-1 multiplexer 372, and a 3-to-1 multiplexer 374. As described below in more detail, the multiplexer 372 selects between 2 possible sources for data which are output by the ASIC 301 onto the network output signal lines N1POSOP 434 and N1NEGOP 436. The select control lines (not shown) of the multiplexers 372 and 374 are controlled by the command and control block 300. For example, when performing a network loopback function, the multiplexers 372 and 374 are commanded by the control block 300 to select the CLK SYNC 302 output lines 376, 378, and 380. As a result, during loopback, the signals presented on the tip-1 410 and ring-1 412 signal lines are re-routed by the Remote Module 100 to the tip-2 448 and ring-2 450 signal lines (respectfully) for re-transmission to the network. The multiplexers 382 and 384 function in a similar manner during a CPE loopback function. That is, during a CPE loopback, the select control lines of the multiplexers 382 and 384 are selected by the control block 300 to re-route the signals presented on the CPE input data lines (e.g., CPEPOSIP 432 and CPENEGIP 430) to the CPE output data lines (e.g., CPEPOSOP 454 and CPENEGOP 452).

The data outputs of the CLK SYNC 302 and the CLK SYNC 340 are routed to the command and control block 300. The command and control block 300 processes the data received from the CLK SYNC blocks, 302, 340 and transfers the received data to the SRAM 402 (FIG. 6) over the data line DS1DAT 480. The control block 300 stores configuration information for the ASIC. It also reports status and error counts back to the microprocessor. The SRAM is used to store a snapshot of the incoming data stream to be used by the microcontroller to perform off-line framing on the signal. Data received from the network (i.e., over the receive data lines N1POSIP 426 and N1NEGIP 424), and processed by the CLK SYNC 302, is transmitted to the B8ZS/AMI decode block 304. As described above, the B8ZS/AMI decode blocks 304, 342 allow the Remote Module 100 to accommodate two different types of "zero suppression" techniques: Binary with Eight Zeros Substitution and Alternate Mark Inversion. The conversion of data between the two zero suppression techniques is well known in the art.

As shown in FIG. 5, the output of the B8ZS/AMI decode block 304 is coupled via a data line 386 to a second input line of a 4-to-1 multiplexer 388. The select control lines (not shown) of the multiplexer 388 are controlled by the command and control block 300. By controlling the select control lines of the multiplexer 388, the command and control block can selectively control the data that is input to the AMI/B8ZS encode block 328 and the data that is eventually output to the CPE output data lines 452, 454. For example, to output unmodified CPE output data, the command and control block 300 selects the second input of the multiplexer 388 (e.g., by presenting a binary "01" on the select control lines), which is coupled to the data line 386, for output to the encode block 328. However, when the command and control block 300 selects any of the other 3 inputs to the multiplexer 328, the data received from the network via data lines 424, 426 is modified before being transmitted to the CPE 40.

For example, when the control block 300 selects the first input of the multiplexer 388, the multiplexer selects input line 390. Input line 390 is tied to a logical "high" signal, which forces the output of the multiplexer 388 to output logical "1's" when the input line 390 is selected. The command and control block 300 selects input line 390 when generating an AIS signal to the CPE 40. The command and control block 300 generates the AIS signal when it detects errors in the signal received from the network. The AIS signal is generated by overwriting the transmit data with a series of unframed logical 1's.

A similar technique is used when generating AIS signals to the network upon failure of the CPE-generated data. For example, when the control block 300 detects a loss of signal in the CPE data lines 430, 432 the control block 300 forces select lines of a 4-to-1 multiplexer 392 to select an AIS GEN input line 394. By selecting the input line 394, the control block 300 forces network output lines 434, 436 to logical 1's for a period of time. However, not all of the network output bits are overwritten with logical 1's. For example, the DL is not overwritten with 1's. The command and control block 300 overwrites data in a manner which depends upon the DL format used by the Remote Module 100. For example, if the DL uses a "scheduled" message format, the flags "01111110" "01111110" are transmitted to the network, while all other overhead and payload bits are forced to a logical 1. This produces a signal which is easily detected by other network devices. This enables network devices to determine that the alarm is caused by CPE 40, rather than network equipment. If the DL uses an "unscheduled" message format, all bits, with the exception of the idle code, are forced to a logical 1.

By selecting the third inputs of the multiplexers 388, 392, the data output by the ASIC 301 (for transmission to either the CPE or the network) is modified as described below. For example, the third input of multiplexer 388 is coupled via data line 396 to the output of a 4-to-1 multiplexer 398. The select control lines (not shown) to the multiplexer 398 are controlled by the control block 300. When the third input of the multiplexer 388 is selected, the data presented on the data line 396 is eventually output to the CPE 40. The data that is presented on the data line 396 depends upon which of the 4 inputs of the multiplexer 398 are selected by the control block 300.

For example, if the output of the bit 2 OWR block 316 is selected, bit 2 of each channel byte is overwritten with a logical "0" by the Remote Module 100. As described above, the present invention uses 2 different means for encoding an RAI signal. One means requires overwriting bit 2 of each channel byte to 0 for a period of not less than 1 second. To accomplish this task, the control block 301 selects the output of bit OWR block 316 as the input to multiplexer 398 whenever an RAI signal is detected. The other means requires transmitting repetitive unscheduled messages having a pattern of eight 1's followed by eight 0's. To perform this function, the control block 300 selects the output of a 3-to-1 multiplexer 303 and concurrently selects the UNSCH MSG INS block 326 for output from the multiplexer 303. The UNSCH MSG INS block 326 provides the desired pattern of eight 1's followed by eight 0's for transmission through the multiplexer 303, the multiplexer 398, the encode block 328, and to the CPE through the output data lines 452, 454. Thus, the RAI is sent as an unscheduled DL message in accordance with ANSI T1.403 standard.

By selecting the output of the CRC insertion block 318 via the multiplexer 398, the command and control block 300 inserts CRC codes into the data stream to be output to the CPE. A 6-bit CRC code is calculated over a superframe of data in a manner specified by national standard. A CRC code is generated after the transmission of its associated superframe of data. The CRC code is inserted into the transmitted data stream by controlling the appropriate select control lines of the multiplexers 388, 398.

By selecting the output of the FRM INS block 320 via the multiplexer 398, the command and control block 300 inserts framing patterns into the outgoing data bit stream. The FRM INS 320 block output is selected when the ASIC 301 performs frame format conversion. The FRM INS block sends the appropriate framing patterns to be overwritten during frame format conversion. The control block keeps track of and controls the locations to be overwritten for correct frame format conversion.

The Remote Module 100 may be configured to operate in a transparent state (no frame format conversion), a conversion state (SF-format to/from ESF-format), and an "autoframe" state. As described in more detail below, when the Remote Module 100 operates in the autoframe state, the command and control block 300, together with the microprocessor 400, automatically performs frame format conversion, if possible, and suppresses format conversion when required.

The Remote Module 100 performs performance monitor operations upon the signal received from the CPE 104. The parameters which are monitored by the Remote Module to generate PRMs are CRC errors, frame bit errors, line code violations (e.g., BPVs) and slips. In accordance with the ANSI Standard T1.231-1993, the Remote Module 100 detects an errored second (ES). An error condition is determined by logically-ORing the occurrence of one or more Bipolar Violations within a measured second having frame bit errors. If an error condition is detected, bit U2 (as defined by ANSI Standard T1.403-1989) of the next PRM generated and sent to the network is changed from a logic 0 to a logic 1. Patterns having the following definitions are written into the 4 Kb/s DL channel (using the unused R bits in the PRMs):

TABLE 1

| BIT PATTERNS* | DEFINITIONS |
|---|---|
| 00000000 . . . | No Remote Module present or Remote Module disabled. |
| 11111111 . . . | Remote Module is generating PRMs which displace any data transmitted by the CPE on the DL. |
| 10101010 . . . | Remote Module hardware fault detected. |
| 10001000 . . . | Remote Module present but simply passing PRMs, no generation of PRMs. |

When the facilities data link does not carry a PRM, it is flag-filled with the following pattern: 01111110. If an LOS is detected from the network, the present Remote Module 100 transmits an RAI priority message to the telephone network 106. Such a message overwrites any PRM data being transmitted. This RAI feature may be optionally disabled.

When the CPE uses an ESF-formatted signal, the Remote Module 100 treats the DL channel in a different manner depending upon the ESF format generated by the CPE. For example, if the CPE uses an ESF without PRMs, the unused capacity of the DL channel is used by the Remote Module 100 as described above for SF-formatted CPE signals. However, the Remote Module 100 does not need to perform SF-to-ESF conversion in this case.

If the CPE 104 uses an ESF with ANSI T1.403 PRMs, the Remote Module 100 does not write the PRMs into the DL channel. The Remote Module 100 measures the performance of the signals received from the network and from the CPE 104. If parameters are measured in the signal from the network, which would result in a non-zero parameter in a PRM, bit U1 of the next PRM which has passed through the Remote Module 100 from the CPE 104 to the telephone network 106, is changed from a logic 0 to a logic 1 value. If parameters measured in the signal from the CPE 104 result in a non-zero parameter in a PRM, bit U2 of the next PRM, which is passed through the Remote Module 100 from the CPE 104 to the telephone network 106, is changed from a logic 0 to a logic 1 value.

If the CPE 104 uses an ESF format with AT&T PUB 54016 Performance Reporting, the unused capacity of the DL channel is used as described above with reference to the SF-formatted signals generated by the CPE 104. However, as before, there is no need to perform a frame format conversion. The Remote Module 100 monitors the signal received from the network for AT&T-formatted maintenance messages. Upon observing the completion of an AT&T-formatted maintenance message, the Remote Module 100 suppresses the transmission or completion of transmission of PRMs which are generated by the Remote Module 100 until either the station polled by the message completes transmission of its response message or until 500 milliseconds elapse without a transmission from the polled station. The Remote Module 100 generates ANSI-formatted PRMs and interleaves them with the AT&T PRMs generated by other network elements. Performance monitoring is not performed on unframed signals.

Relatively smooth transitions from the ESF to the SF formats have been observed in CPE signals arriving at network interfaces. These transitions have misled prior art framers to continue to declare an in-frame condition on a purported ESF signal because the prior art ESF framers do not declare a sufficient amount of errors on an SF signal to cause the declaration of an out-of-frame indication for certain alignments between the framer and such a counterfeit signal. Provisioning is therefore preferably made in the Remote Module 100 to avoid mistaking an SF-formatted signal for an ESF signal. The Remote Module 100 accomplishes this by preferably logically-ANDing a high frame bit error ratio (from 1-in-2 to 1-in-6 frame bits in error) with a high rate of CRC errors as an indicator of a counterfeit pattern.

Of the 12 possible alignments between the SF and ESF overhead patterns, 2 cause the SF overhead bits ($F_t+F_s$ pattern) to mimic the ESF pattern with only 1 error in 6 frame bits. Although this frame bit error ratio is too high to allow an in-frame declaration while framing, it is too low to cause an in-frame signal to go out-of-frame. However, such a "counterfeiting" of the ESF patterns is accounted for by the Remote Module.

The out-of-frame blocks 310, 348 count frame errors in known fashion and generate out-of-frame signals when at least two of the last four frame bits are in error. The CRC blocks 312, 350 calculate CRC codes in a known fashion for incoming data streams. The DL detect blocks 314, 352 monitor the position of the DL within the data stream and in known fashion strip the DL data from an incoming data stream. The FIFOs 322, 324, 362 and 364 buffer DL data so that the microcontroller 400 does not need to constantly poll the ASIC 301 and thereby exhaust the microcontroller's processing resources. The FIFOs 322, 324, 362 and 364 thereby allow the microcontroller 400 to poll the ASIC 301 on a relatively infrequent basis which frees the microcontroller 400 to perform other functions.

Sectionalizer

Figure 7:
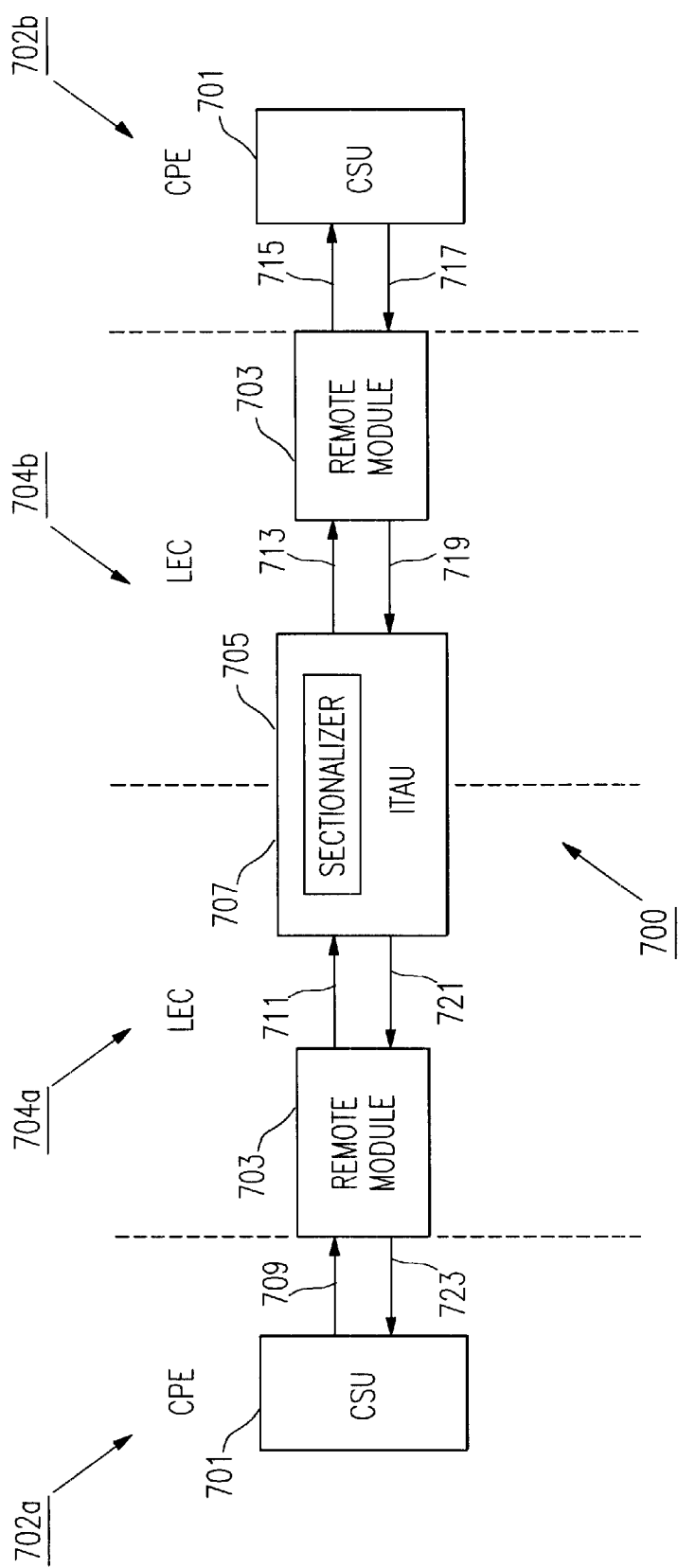
FIG. 7 is a simplified illustration of a data path which includes the Remote Module and Sectionalizer of the present invention.

The present invention utilizes the information gathering capabilities of various monitoring devices of a data path (such as the Remote Module and an Integrated Transport Access Unit (ITAU)) to monitor and determine the origin of "Events" within the data path. That is, by generating data derived from signals received by each monitoring device and transmitting the data to a Sectionalizer in accordance with the present invention, Events can be determined to have originated between a particular pair of the adjacent monitoring devices. FIG. 7 is a simplified illustration of a data path 700 which includes monitoring devices (such as a Remote Module 705 and Sectionalizer 707) of the present invention.

In accordance with the embodiment illustrated in FIG. 7, the communications signal originates at a channel service unit (CSU) 701 within the customer premises equipment (CPE) 702a. The signal is routed through a network interface unit (NIU) 703, which is preferably a Remote Module as described above. As described above, the Remote Module 703 is located at the network interface (i.e., point of demarcation between the CPE 702 and a local exchange carrier (LEC) 704). In accordance with one configuration, the output from the Remote Module 703 is coupled to a multiplexer (such as the M13 shown in FIG. 3b) which combines a plurality of DS1 signals into a DS3 signal. Such a multiplexer is not shown in FIG. 7 for simplicity.

The output from the Remote Module 703 is shown to be coupled to a test and monitoring device. In accordance with the preferred embodiment of the present invention, the test and monitoring equipment is an ITAU 705 as described in U.S. Pat. No. 5,495,470 entitled "Alarm Correlation System for a Telephone Network" and U.S. Pat. No. 5,500,853 entitled "Relative Synchronization System for a Telephone Network", each assigned to the assignee of the present application and each being incorporated herein by this reference. In accordance with the present invention, the ITAU 705 includes a Sectionalizer 707 in accordance with the present invention. The output from the ITAU 705 is shown coupled to a second Remote Module 703 located at the point of demarcation between the CPE 702*b* at the receiving end of the data path 700 and the LEC 704*b*. In many instances, the same LEC 704 will not be directly coupled to both CPEs 702*a*, 702*b* at two ends of the data path 700. Accordingly, there may be a second ITAU (not shown). The first and second ITAU are then coupled through an intermediate exchange carrier (IEC) (not shown). However, for the purpose of the present invention, it is not necessary to consider the connections which occur between the two ITAUs 705, since the present invention attempts to determine the status of only the eight legs 709, 711, 713, 715, 717, 719, 721, 723 shown in FIG. 7. Each such ITAU will preferably operate identically, and will preferably have a Sectionalizer 707 which operates identically. The Remote Module 703 at the receiving end of the data path is coupled to a CSU 701 within the receiving CPE 702.

In one embodiment of the present invention, a method and apparatus is provided for sectionalizing the data path to allow a determination to be made as to whether an Event is caused by a component at the customer premises or by a component located outside the customer premises (i.e., equipment that is maintained by the LEC 704 or the IEC). By determining whether equipment at the customer premises is responsible for an Event, a determination can be made as to whether the customer or the LEC 704 is responsible for more particularly identifying which component within the system has caused the Event, repairing or replacing the defective equipment and thus preventing the Event from reoccurring.

In accordance with the preferred embodiment of the present invention, the ITAU 705 preferably has the ability to monitor Events, including all of the DS1 performance primitives and parameters defined within the American National Standards Institute publication ANSI T1.231. These include: performance anomalies, such as line anomalies (including bipolar violations (BPV) and excessive zero (EXZ)), path anomalies (such as cyclical redundancy check errors, frame bit errors, line defects, such as Loss of signal (LOS)), and path defects (such as out of frame (OOF) and alarm indication signal (AIS)).

In addition to directly monitoring the signals received from the Remote Module 703, the ITAU 705 has the ability to decode scheduled messages, such as a Performance Report Message (PRM) transmitted by the CSU 701, and unscheduled messages, such as RAI in ESF format. In accordance with ANSI T1.231, PRMs include information regarding the signal that was received by the device which generates the PRM. ANSI T1.231 PRMs include a bit for determining whether the PRM was generated within the customer installation (CI) or by the carrier and data concerning the status of the signal over the last four seconds, including: (1) how many CRC errors were present; (2) whether a severely errored frame occurred; (3) whether a frame synchronization bit error event occurred; (4) whether a line code violation event occurred; (5) whether a slip event occurred; and (6) whether payload loopback is activated. In accordance with one configuration of the present invention, PRMs are generated by the CSU 701. Accordingly, the ITAU 705 can determine the status of signals transmitted over the leg 723 between the Remote Module 703 and the CSU 701, and at the other end of the path 700, signals transmitted over the leg 715 between the Remote Module 703 and the CSU 701.

Preferably, additional information can be inserted into the PRMs by the Remote Module 703. That is, in accordance with one embodiment of the present invention, the Remote Module performs performance monitoring operations upon the signal received from the CSU 701. The parameters which are monitored by the Remote Module include CRC errors, frame bit errors, line code violations, and slips. It should be understood that in an alternative embodiment of the present invention, the Remote Module may be configured to monitor other combinations of performance primitives and parameters. Preferably, each Remote Module 703 controls three bits within the ANSI PRM in order to communicate the status of the signals that are received by the Remote Module from both the CSU 701 and the ITAU 705. These three bits are the "U1", "U2", and "R" bits, as defined by ANSI T1.403-1995. For example, if ANSI PRMs are being generated by the CSU 701, and an Event is detected by the Remote Module 703 on leg 721 from the ITAU 705, then the Remote Module 703 determines which PRM received from the CSU 701 corresponds to the Event noted by the Remote Module 703. The U1 bit within the corresponding PRM is then asserted to indicate that the Remote Module has detected an Event on leg 721. Similarly, the U2 bit is asserted if the Remote Module determines that an Event has occurred on leg 709. In addition, the R bit is used to indicate one of four possible conditions, as shown in Table 1 above.

Preferably, the R bit is transmitted at a rate of 1 bit per PRM (or one bit per second). Each new R bit value is written into the R bit associated with the most recent message. The value of the R bit is then shifted each second along with the other bits associated with the message for that second. Accordingly, the ITAU 705 receives from the Remote Module 703 information which can be used to determine the status of particular legs of the data path 700.

AIS-CI

In addition to supplementing the PRMs generated by the CSU 701, the Remote Module also preferably provides additional information to the ITAU 705 regarding the origin of AIS and RAI signals. For example, the Remote Module 701 preferably generates an Alarm Indication Signal-Customer Installation (AIS-CI) signal which indicates whether trouble which would lead to the generation of AIS by the ITAU 705 is present in the signal that is received by the Remote Module 703 from the CSU 701. In the preferred embodiment, the AIS-CI signal is a variant of the AIS signal defined in T1.403 Clause 9.2. Preferably, the density of ones within the AIS-CI signal is such that the signal will be detected as an ANSI T1.403 AIS signal. However, the density of zeros is such that equipment that is designed to detect the signal as an AIS-CI signal will be able to distinguish the signal from an all ones signal. The AMS-CI signal is preferably a repetitive interleaving of 1.11 seconds of an unframed all ones pattern and 0.15 seconds of all ones modified by the AIS-CI signature. The AIS-CI signature alters one bit at 386 bit intervals in the DS1 signal. In accordance with one embodiment of the present invention, the AIS-CI signature is the pattern "0111110011111111" (right to left) in which each of these bits is inserted at the beginning of a series of 386 bits. This results in a repetitive pattern 6176 bits in length in which, if the first bit is numbered bit 1, bits 3088, 3474, and 5790 are logical zeroes and all other bits in the pattern are logical ones. In the preferred embodiment of the present invention, a candidate AIS-CI signal is declared to be AIS-CI if 99.9% of the bits in the signal conform to the AIS-CI signature pattern. In an alternative embodiment of the present invention, a plurality of signatures may be defined, each being unique to a particular location within the data path. Accordingly, when an AIS signal is generated, the first device to generate that AIS signal will modify the AIS by imposing the AIS-CI signature, thus allowing equipment further upstream to determine the point within the data path at which the signal was lost.

RAI-CI

The Remote Module preferably generates a Remote Alarm Signal-Customer Installation (RAI-CI) signal which indicates whether the signal received at the Remote Module 703 from the ITAU 705 is in a condition that would cause the CSU 701 to generate an RAI signal. In accordance with one embodiment of the present invention, the RAI-CI signal is defined as a frame format dependent signal carried on the DL associated with the signal. Therefore, when the signal being transmitted from the Remote Module is in ESF format, the RAI-CI is an unscheduled message corresponding to ANSI Extended Superfame RAI modified as follows. For a period of 90 milliseconds every 1.08 seconds, the unscheduled message "0000000011111111" (right to left) in the DL is replaced with the message "0011111011111111" (right to left). This signal satisfies the definition set forth in ANSI T1.403-1995 section 9.1. Accordingly, the ITAU 705 is provided with additional information from which the ITAU 705 can determine whether a received RAI message is provided in response to an Event that originated at the CPE 702 or LEC 704.

If, on the other hand, the signal is being transmitted by the Remote Module toward the network in SF format, then the Remote Module shall issue RAI-CI toward the network by setting bit 3 of every channel in each frame to logical one if the following conditions are met: (1) RAI is detected in a SF-formatted signal from the CI, and (2) no condition leading to the declaration of RAI is detected in the signal from the network. No other bits, including the stream of logical zeroes in bit 2 of every channel which indicates RAI, shall be modified.

Event Levels

The preferred embodiment of the present invention assigns a value from 0–7 to each leg of the data path 700 for each DS1 and DS3 signal being communicated over the path. Each value corresponds to one of eight Event Levels, as shown in Table 2.

TABLE 2

| | |
|---|---|
| Event Level 0 | no errors are present |
| Event Level 1 | presence of an Errored Second |
| Event Level 2 | presence of a severely Errored Second |
| Event Level 3 | not assigned in the preferred embodiment |
| Event Level 4 | Remote Alarm Indication |
| Event Level 5 | Alarms (LOS, OOF, AIS) |
| Event Level 6 | RAI-CI |
| Event Level 7 | AIS-CI |

It should be noted that both alarm conditions which indicate a complete loss of the ability to decode the payload, and conditions which merely indicate a degradation in the signal quality due to errors in either the payload or the overhead, are considered concurrently by the present invention in determining the origin of an Event. That is, Events are defined to include both complete loss of the ability to decode the payload and conditions which merely indicate a degradation in the signal quality. However, it should be understood that in the preferred embodiment of the present invention, Events may be accurately sectionalized only if there is one source of the Event. If Events originate at more than one location within the data path 700, then the present invention may not be able to determine the origin of the Events.

Initially, the Sectionalizer of the present invention reformats the performance monitoring data that has been acquired by the ITAU 705 and determines the Event Level associated with each leg of the data path 700 for each DS1 and DS3 signal. For example, the Event Level of leg 711 is determined as follows.

The first step in determining the Event Level associated with leg 711 is to read the performance data collected by the ITAU 705 to determine whether an AIS-CI signal pattern is being received by the ITAU 705 from the Remote Module 703. If so, then the Event Level associated with leg 711 is set to 7. If not, then a determination is made as to whether AIS, a loss of signal (LOS) or an out-of-frame (OOF) condition is being received at ITAU 705. If so, then the Event Level associated with leg 711 is set to 5. If not, then a determination is made as to whether the ITAU 705 is receiving an RAI signal. If so, then the Event Level associated with leg 711 is set to 4. Event Level 3 is unused in the embodiment of the present invention in which the Event Levels are defined as shown in Table 2.

Therefore, if the performance data indicates that no AIS-CI, RAI-CI, LOS, OOF, AIS, or RAI is presently being received by the ITAU 705, the next determination to be made is whether the signal received over the last second at the ITAU 705 is considered to be a "Severely Errored Second" (Event Level 2) or an Errored Second (Event Level 1).

Accordingly, performance monitoring data related to each DS1 signal received by the ITAU 705 on leg 711 over the last second is read to determine whether a Severely Errored Second has been detected by the ITAU 705. If a Severely Errored Second has been detected by the ITAU 705, then the Event Level 2 is associated with leg 711 of that particular DS1 or DS3 signal. In accordance with one embodiment of the present invention, a DS1 Severely Errored Second is defined to include each of the following:

(1) a severely errored second-line (SES-L) as defined by ANSI T1.231-1993 at paragraph 6.5.1.3; and
(2) a severely errored second (SES-P) as defined by ANSI T1.231-1993 at paragraph 6.5.2.5.

If no Severely Errored Second has been detected by the ITAU 705, then the Sectionalizer of the present invention reads the performance primitives and parameters stored in the ITAU 705 to determine whether Event Level 1 should be associated with leg 711. Accordingly, the Sectionalizer reads the performance monitoring data related to both DS1 and DS3 signals acquired by the ITAU 705 over the last second to determine whether either a DS1 or DS3 Errored Second has occurred.

In accordance with one embodiment of the present invention, a DS1 Errored Second is defined as any one of the following:

(1) an effored second-line (ES-L) as defined by ANSI T1.211-1993 at paragraph 6.5.1.2;
(2) an errored second-path (ES-P) as defined by ANSI T1.231-1993 at paragraph 6.5.2.2;
(3) an errored second type A (ESA-P) as defined by ANSI T1.231-1993 at paragraph 6.5.2.3;
(4) an errored second type B (ESB-P) as defined by ANSI T1.231-1993 at paragraph 6.5.2.4; and
(5) a frame bit error (FBE) as defined by ANSI T1.231-1993 at paragraph 6.1.1.2.2.

In accordance with one embodiment of the present invention, DS3 Errored Seconds are defined as any one of the following:

(1) errored second-line (ES-L) as defined by ANSI T1.231-1993 at paragraph 7.4.1.2;

(2) errored second-line type A (ESA-L) as defined by ANSI T1.231-1993 at paragraph 7.4.1.3;

(3) errored second-line type B (ESB-L) as defined by ANSI T1.231-1993 at paragraph 7.4.1.4;

(4) errored second (ESP-P, ESCP-P) as defined by ANSI T1.231-1993 at paragraph 7.4.2.2;

(5) errored second type A (ESAP-P, ESACP-P) as defined by ANSI T1.231-1993 at paragraph 7.4.2.3; and (6) errored second type B (ESBP-P, ESBCP-P) as defined by ANSI T1.231-1993 at paragraph 7.4.2.4.

It should be clear to one of ordinary skill in the art that the particular performance primitives and parameters that are considered is implementation dependent. Therefore, alternative embodiments of the present invention may either define Errored Seconds differently, or may use other performance primitives and parameters to determine the status of the signal that is received by the ITAU 705. In particular, in accordance with one embodiment of the present invention, the presence of frame bit errors in the signal received from the Remote Module 703 by the ITAU 705 will cause an Event Level 1 indication.

In a manner similar to that described above with regard to leg 711, the Sectionalizer of the present invention determines the Event Level to be associated with leg 709. However, since the ITAU 705 is not the point of termination for leg 709, the ITAU 705 relies upon information supplied by the Remote Module 703. For example, in accordance with one embodiment of the present invention, the Remote Module 703 indicates whether an alarm condition is present on leg 709 by modifying the AIS signal to form the AIS-CI. If the Remote Module 703 detects an AIS on leg 709, then the Remote Module 703 generates an AIS-CI signal, as described above. When the ITAU 705 receives the AIS-CI signal, that indication is stored and read by the Sectionalizer. Accordingly, when the Sectionalizer begins determining the Event Levels of each of the legs 709, 711, 721, 723 the fact that an AIS-CI was received by the ITAU 705 will cause an Event Level 7 to be associated with leg 711. If the ITAU 705 has not received an AIS-CI signal from the Remote Module 703, then the Sectionalizer 707 reads the performance monitoring information stored by the ITAU 705 to determine whether the U2 bit was asserted within the PRM received by the ITAU 705 from the Remote Module 703. As noted above, the Remote Module 703 preferably asserts the U2 bit within a PRM in order to communicate to the ITAU 705 that the Remote Module has detected an Event. In the preferred embodiment of the present invention, the U2 bit within the ANSI PRM is asserted by the Remote Module 703 whenever the Remote Module 703 detects an Errored Second. In accordance with one embodiment of the present invention, the Remote Module 703 has no means by which to distinguish between a Severely Errored Second and an Errored Second detected on leg 709. Accordingly, in one embodiment of the present invention, Event Level 2 is not valid for leg 709. However, it should be understood by those skilled in the art that in an alternative embodiment of the present invention, the Remote Module 703 may be implemented such that a distinction can be made between Severely Errored Seconds and Errored Seconds, thus making both Event Levels 1 and 2 valid for leg 709.

With regard to leg 723, the Sectionalizer 707 reads the performance monitoring information stored in the ITAU 705 to determine whether the ITAU 705 has received an RAI-CI signal. If so, then Event Level 6 is associated with leg 723. Otherwise, assuming that the CSU 701 is generating PRMs, the Sectionalizer reads the performance monitoring information stored in the ITAU 705 to determine whether any of the following have occurred: (1) a CRC error event; (2) a severely errored framing event; (3) a frame synchronization bit error event or out of frame condition; (4) a line code violation event; (5) a controlled slip event; (6) an excess zero condition; (7) presence of an alarm indication signal; (8) presence of a remote alarm indication; or (9) loss of signal. It will be understood by those skilled in the art that the ITAU 705 receives information through the PRM regarding the status of leg 723. In accordance with one embodiment of the present invention, if any of the above mentioned five events have occurred (i.e., any Performance Monitoring (PM) bits of an ANSI PRM are asserted) then Event Level 1 is associated with leg 723.

The same procedure is followed to determine the Event Level to be associated with legs 713, 715, 717, and 719. That is, the same method may be used to determine the status of leg 713 that was described above for determining the Event Level associated with leg 721. Likewise, the Event Levels associated with legs 715, 717, and 719 can be determined in the same manner as described above with respect to legs 723, 709, and 711, respectively.

Generation of Masks

In accordance with the preferred embodiment of the present invention, a "Mask" is generated to indicate the Event Levels associated with each leg of each DS1 or DS3 signal. The Mask is a 32 bit long word in which the first 3 bits represent the Event Level associated with leg 711, the second 3 bits represent the Event Level associated with leg 713, etc. In addition to the 24 bits which represent the Event Levels associated with each leg, four pairs of one bit flags are preferably provided as part of the Mask to indicate various conditions. The first pair of these flags (RM-1, RM-2) indicate whether a Remote Module is present between the CSU 701 and the ITAU 705, each flag indicating the presence of one of the two Remote Modules 703. The second pair of flags (CP-1, CP-2) indicate whether PRMs are being generated by the CPE 702, each flag relating to one direction. The third pair of flags (SI-1, SI-2) indicate whether the Sectionalizer 707 is still working to determine the origin of the event (i.e., "Signal Identification" is in progress), each flag relating to one direction. The fourth pair of flags (AIS-1, AIS-2) indicate AIS is being received by the ITAU 705, each flag relating to one direction. The value of these flags may be transmitted to a user in a message, or may be used to alter the appearance of the information to be displayed. Details regarding the appearance of the display output by the Sectionalizer are provided below.

In accordance with the preferred embodiment of the present invention, the Sectionalizer is capable of providing information to users through a display, such as a display which is incorporated within the ITAU 705. Further details regarding the appearance of the display are provided below. Also, in accordance with one embodiment of the present invention, the Sectionalizer is capable of composing messages which can be transmitted over any of communications links available to the ITAU 705 using conventional protocols, such as the Transaction Language 1 (TL1) protocol defined by Bellcore and used in communications between the ITAU 705 and an Operations Systems (OSs). The format for such messages is provided below.

The Event Levels determined for each leg of each signal can be output from the Sectionalizer in one of three "Modes": (1) Filtered Mode, in which the raw information received from the components of the data path are subjected to a filtering process to correlate the Events and provide a more stable output Mask; (2) History Mode, in which the output comprises a collection of previously stored filtered Masks, each representing the Event Levels of each leg of the data path 700 at a point in time. In the preferred embodiment of the present invention, each filtered Mask is stored upon a determination that the leg in which an Event originated has changed; and (3) Current Mode, in which the most recently determined Event Levels are output without filtering.

The output in each of these three Modes can be represented in either a Sectionalized View or a Data View. In Sectionalized View, the Mask(s) to be output are processed by a Sectionalizer Process which sets the Event Level of each leg to zero except for the leg in which the Event originates. The Sectionalizer Process is described in detail below. In Data View, the Mask is output without processing by the Sectionalizer Process.

Once the Event Levels associated with each of the eight legs of the data path 700 are determined for a particular DS1 or DS3 signal, the Sectionalizer 707 preferably implements a two stage filter procedure for each leg of each DS1 signal to be sectionalized. Filtering is preferably performed regardless of which output Mode is selected. Filtering allows the present invention to perform an automatic time correlation function. That is, each monitoring device (e.g., Remote Module, Sectionalizer, CSU, etc.) determines that an Event has occurred when errors are detected during a one second interval. Therefore, an Event that causes errors to occur over a period of 0.75 seconds may be seen by one monitoring device to have occurred entirely within a particular one second interval. However, another monitoring device may detect the Event as having occurred over a period which straddles two different one second intervals (i.e., a first portion of errors occurred in a first second interval, and a second portion of errors occurred in a next one second interval). In order to determine that the errors that are seen at one location are the same errors that were seen at another location, the one second intervals should be synchronized to one another. However, such synchronization is cumbersome. In accordance with the present invention, rather than synchronizing the one second intervals, the following filter function is applied to ensure that an Event that is reported in two different seconds by one device and in only one second in a second device is detected as being one and the same Event.

First Stage Filtering

Figure 8:
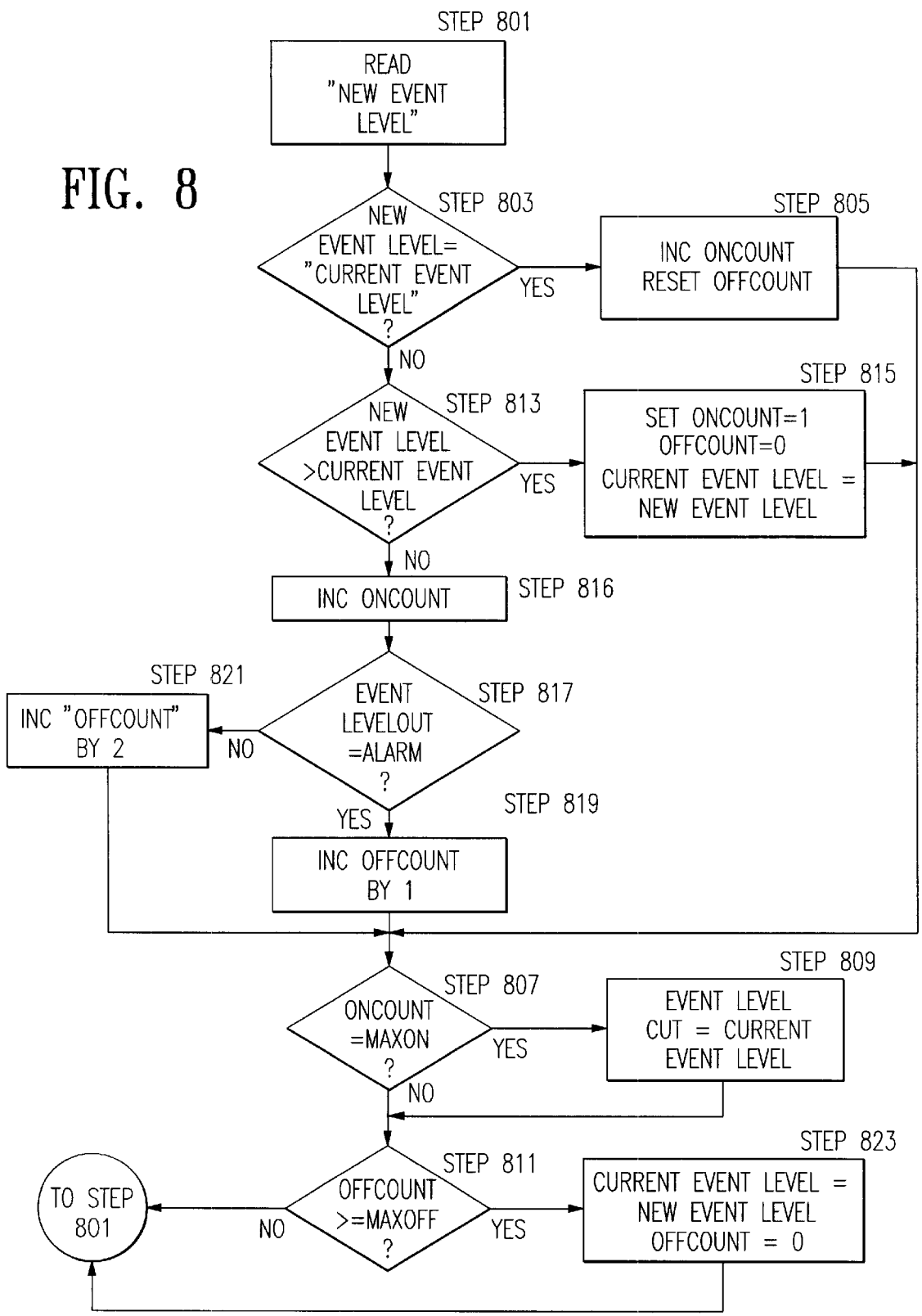
FIG. 8 is a flowchart of the first stage of the filter in accordance with one embodiment of the present invention.

FIG. 8 is a flowchart of the first stage of the filter. The first stage of the filter reduces the number of changes which occur in each Event Level by updating the Event Level only when the value of the Event Level increases or when the value of the Event Level has decreased and remains at a decreased Event Level for a predetermined amount of time. The duration of the predetermined amount of time is preferably dependent upon the value of the Event Level last output from the first stage filter.

Referring to FIG. 8, a "New" Mask is read by the Sectionalizer 707 from the memory within the ITAU 705 at one second intervals (STEP 801). Initially, the New Mask is checked to determine whether the data path is either out of service or under test. In accordance with one embodiment of the present invention, the fact that the data path is out of service is indicated by the ITAU 705 setting the New Event Level associated with leg 709 and leg 717 to an Event Level of "7" within the Mask. It should be clear that an indication that AIS-CI is present is inappropiate for legs 709 and 717 (i.e., an AIS-CI can never occur on either leg 709 or leg 717). Therefore, an Event Level "7"on leg 709 and 717 is redefined to indicate that the data path is out of service. Likewise, an Event Level "6" is inappropriate for either leg 709 or 717. Therefore, in accordance with one embodiment of the present invention, Event Level "6" has been redefined to indicate that the data path is under test. In accordance with the present invention, if the data path is out of service, then the New Mask is overwritten with Event Level "7" in each leg. Similarly, if the data path is in test, then the New Mask is overwritten with Event Level "6" in each leg. If the data path is either out of service or under test, then the New Mask will not have any information that indicates whether a Remote Module is present or whether PRMs are being generated by the CPE. Therefore, in accordance with one embodiment of the present invention, information regarding the presence of a Remote Module and PRMs generated by the CPE is read from an output register of the first filter, which remains unchanged from the last time a received Mask indicated that the data path was not under test or out of service. The information read from the output register is copied into the New Mask.

The New Event Level is then compared with a "Current Event Level" (STEP 803). Initially, the Current Event Level is set to zero. Therefore, if the Event Level for that particular leg is 0 (i.e., there were no Events on that leg), then an "On-Count" value is incremented from an initial value of zero and an "Off-Count" value is reset to zero (STEP 805). The value of the On-Count is then checked to determine whether the On-Count value is greater than a "Max-On" value (STEP 807). The Max-On value is selected to provide stability. In the preferred embodiment of the present invention, the Max-On value is equal to 3.

Since the On-Count will not be equal to the Max-On value the first time through the loop, the value of the Off-Count is compared to a "Max-Off" value (STEP 811). Likewise, the Off-Count will not be equal to the Max-Off count the first time through. Therefore, the process returns to STEP 801. If the New Event Level remains the same as the Current Event Level sufficiently long for the On-Count to increment up to the value of the Max-On value, then the Event Level Out will be set to the value of the Current Event Level. That is, the Current Event Level will have remained stable for a sufficiently long time to pass through the first stage filter and will be output. As long as the New Event Level remains unchanged, the process will continue in this loop.

However, if the New Event Level becomes greater than the Current Event Level (e.g., an errored second is detected in the leg) (STEP 813), then the On-Count is reset to one, the Off-Count is reset to zero, and the Current Event Level is updated with the value of the New Event Level (STEP 815). Since the On-Count will not be equal to the Max-On value (STEP 807), and the Off-Count will not be equal to the Max-Off value (STEP 811), the process returns to STEP 801. If the New Event Level persists for the number of passes required to increment the On-Count value to the Max-On value (STEP 807), then the Event Level will be output from the first stage of the filter by setting the value of the Event Level Out to the value of the Current Event Level (STEP 809).

If, however, the New Event Level is less than the Current Event Level (STEP 803) during one of the passes before the Max-On value is exceeded by the On-Count, then the On-Count will be incremented (STEP 816) and also the Off-Count will be incremented. In accordance with the embodiment of the present invention shown in FIG. 8, the amount by which the Off-Count is incremented is determined by checking whether the Event Level Out value is greater than a predetermined Event Level value, such as "3" in the case shown, (indicating that the event detected is an alarm condition). If greater than "3", then the Off-Count is incremented at a relatively slow rate (e.g., by one) (STEP 819). If, however, the Event Level is not greater than "3", then the Off-Count is incremented at a relatively rapid rate (e.g., by two) (STEP 821). In either case, it can be seen that in accordance with the first stage of the filter of FIG. 8, the value of the Current Event Level is not updated with the value of the New Event Level. Therefore, the higher previously read Event Level will be held until the Off-Count is exceeded in STEP 811. In accordance with the preferred embodiment of the present invention, the On-Count will always become equal to the Max-On value before the Off-Count equals or exceeds the Max-Off value. Accordingly, the highest Event Level will always be output from the first stage of the filter.

If the New Event Level remains below the Current Event Level for a sufficient number of passes for the Off-Count to become equal to or greater than the Max-Off value, then the Current Event Level is updated to the value of the New Event Level, the Event Level Out is set to the value of the Current Event Level, and the Off-Count is reset to zero (STEP 813). The filter process than repeats from STEP 801.

It can be seen that the first stage of the filter operates to reduce the number of times the Event Level Out changes by only changing the output value when the New Event Level drops and remains lower for a predetermined amount of time or the New Event Level increases. Furthermore, it should be noted that the first stage of the filter operates on the Event Level associated with each leg of the data path 700 independently.

Second Stage Filtering

Figure 9:
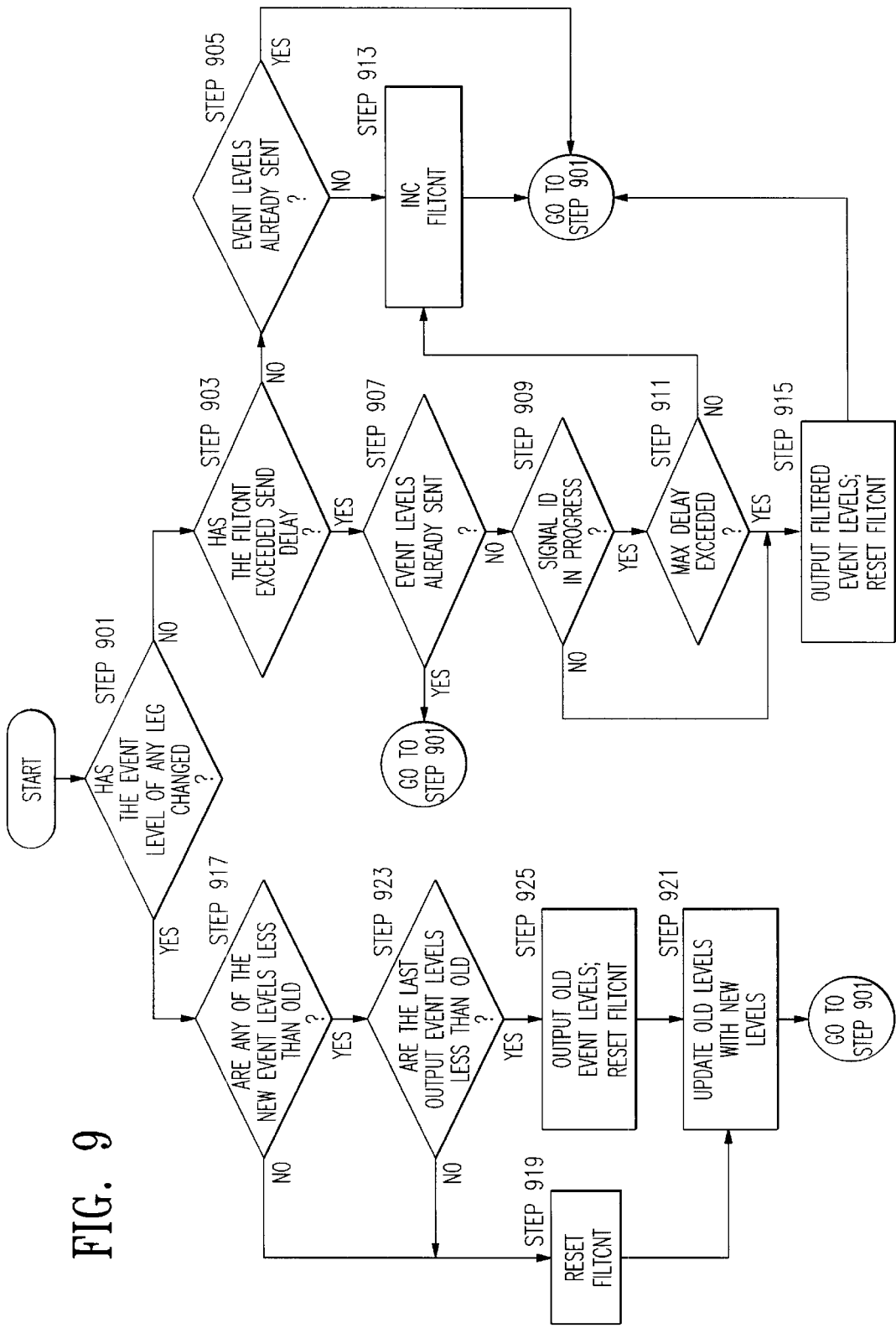
FIG. 9 is a flowchart of the process of the second stage of the filter in accordance with one embodiment of the present invention.
Figure 10A:
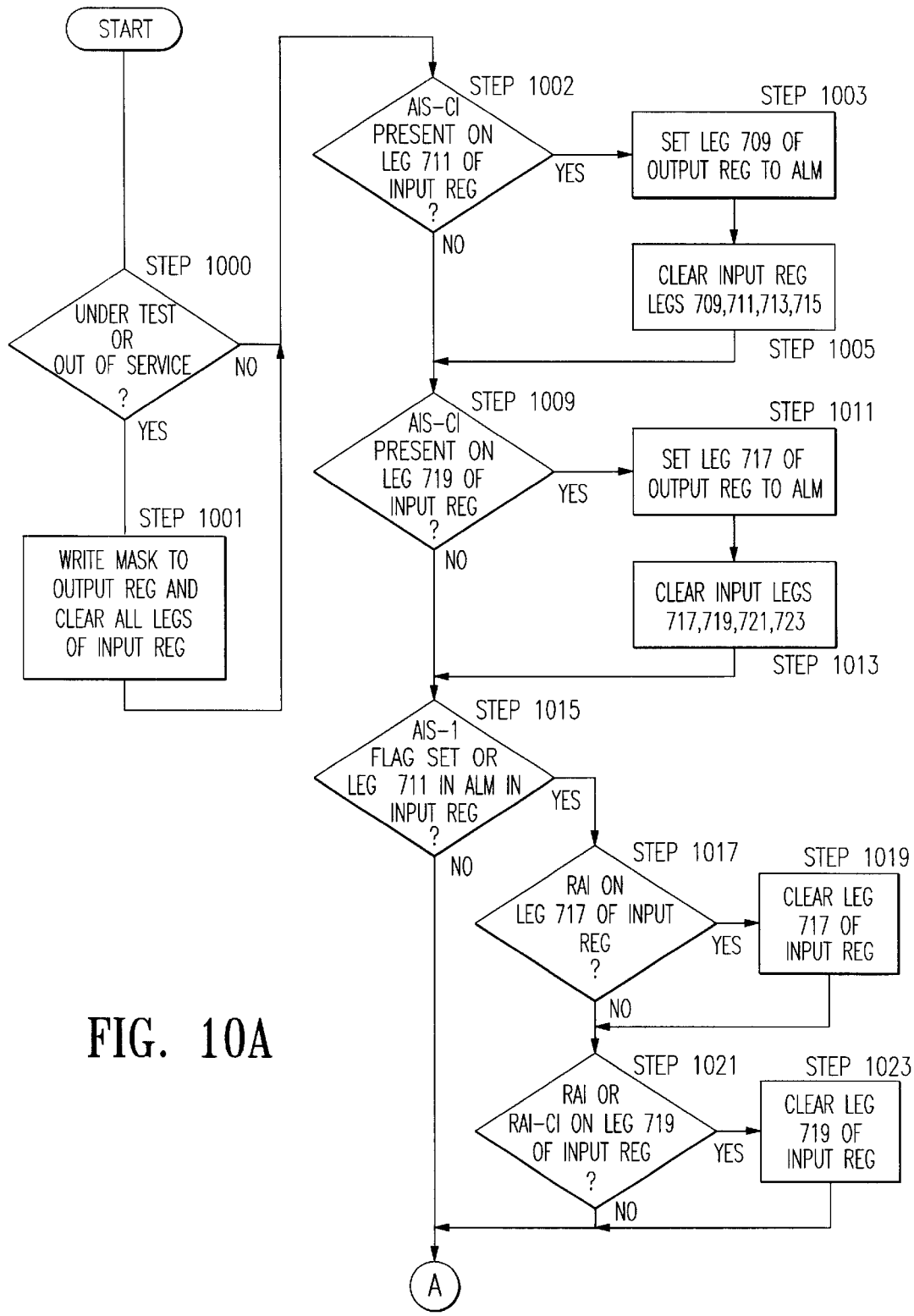
FIGS. 10a–10g illustrate a flowchart of the Sectionalizer Process in accordance with one embodiment of the present invention.
Figure 10B:
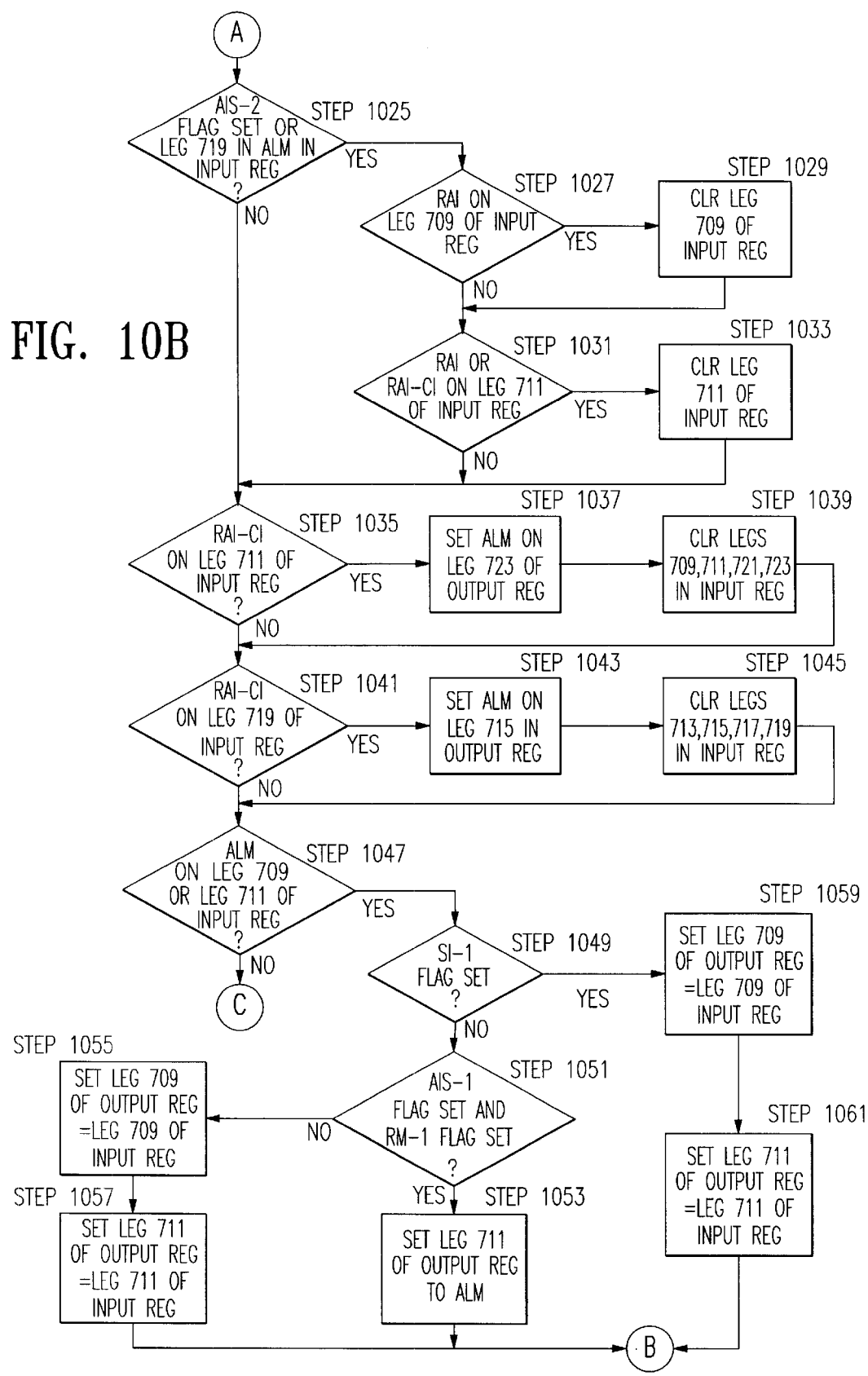
Figure 10C:
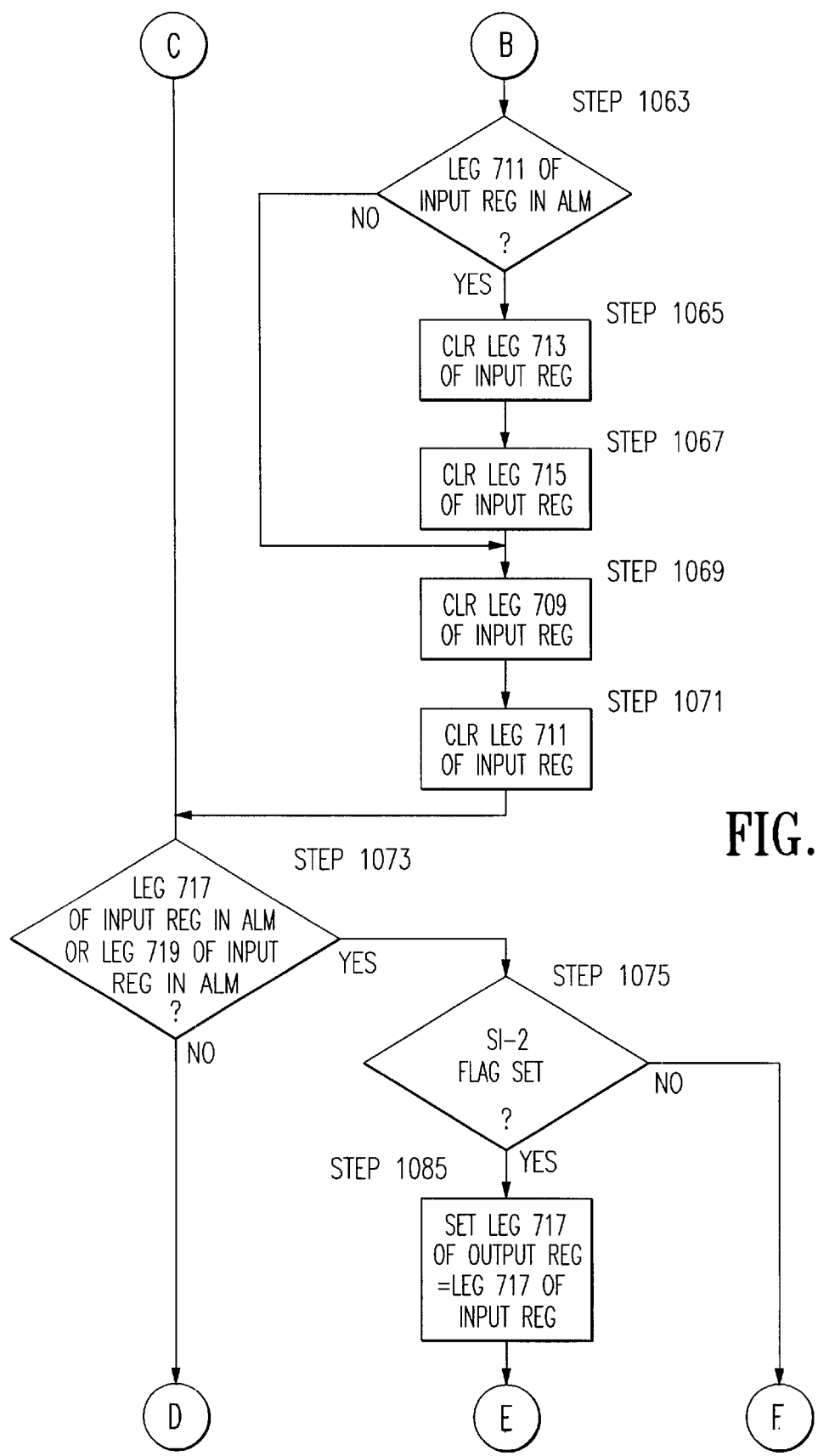
Figure 10D:
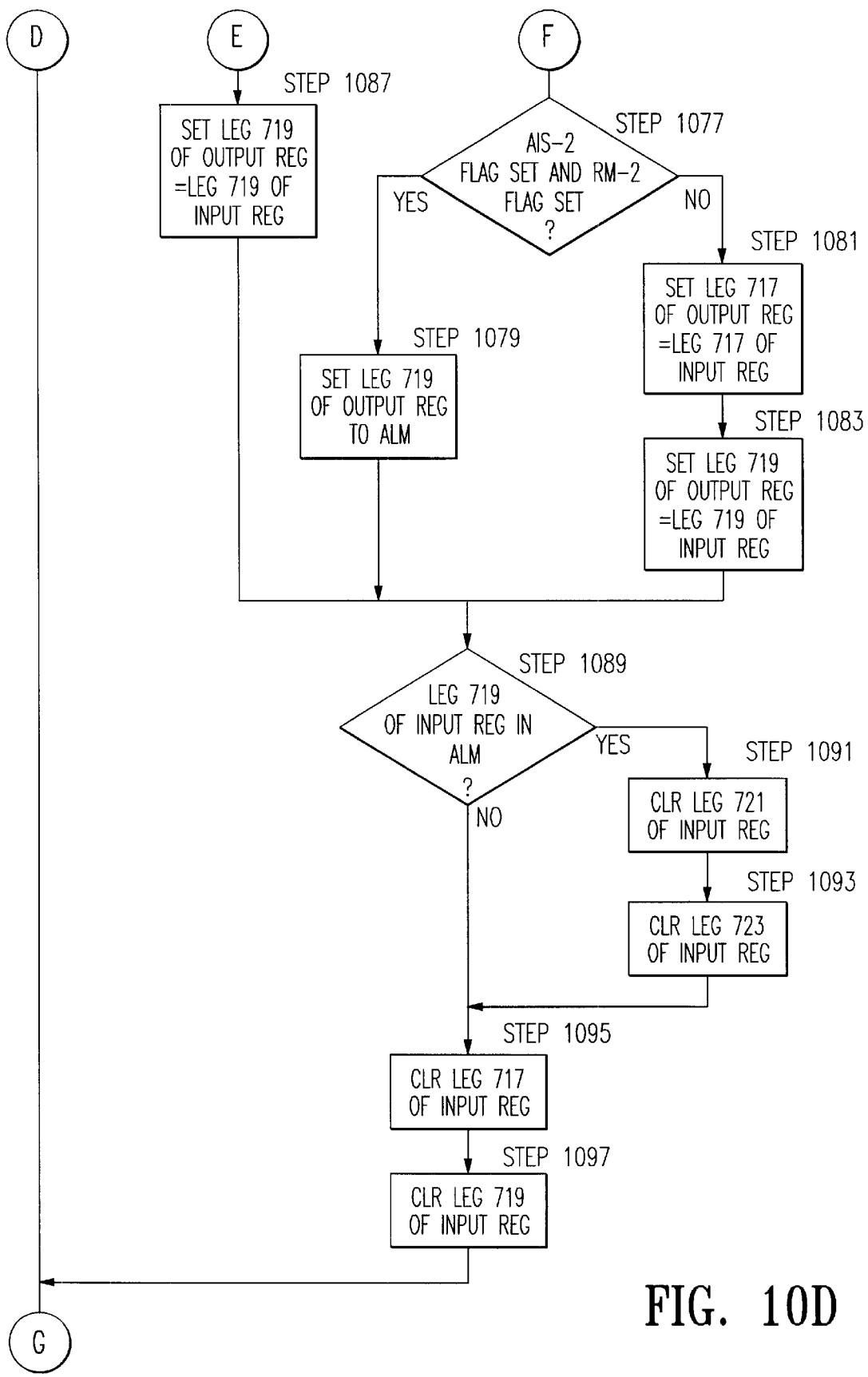
Figure 10E:
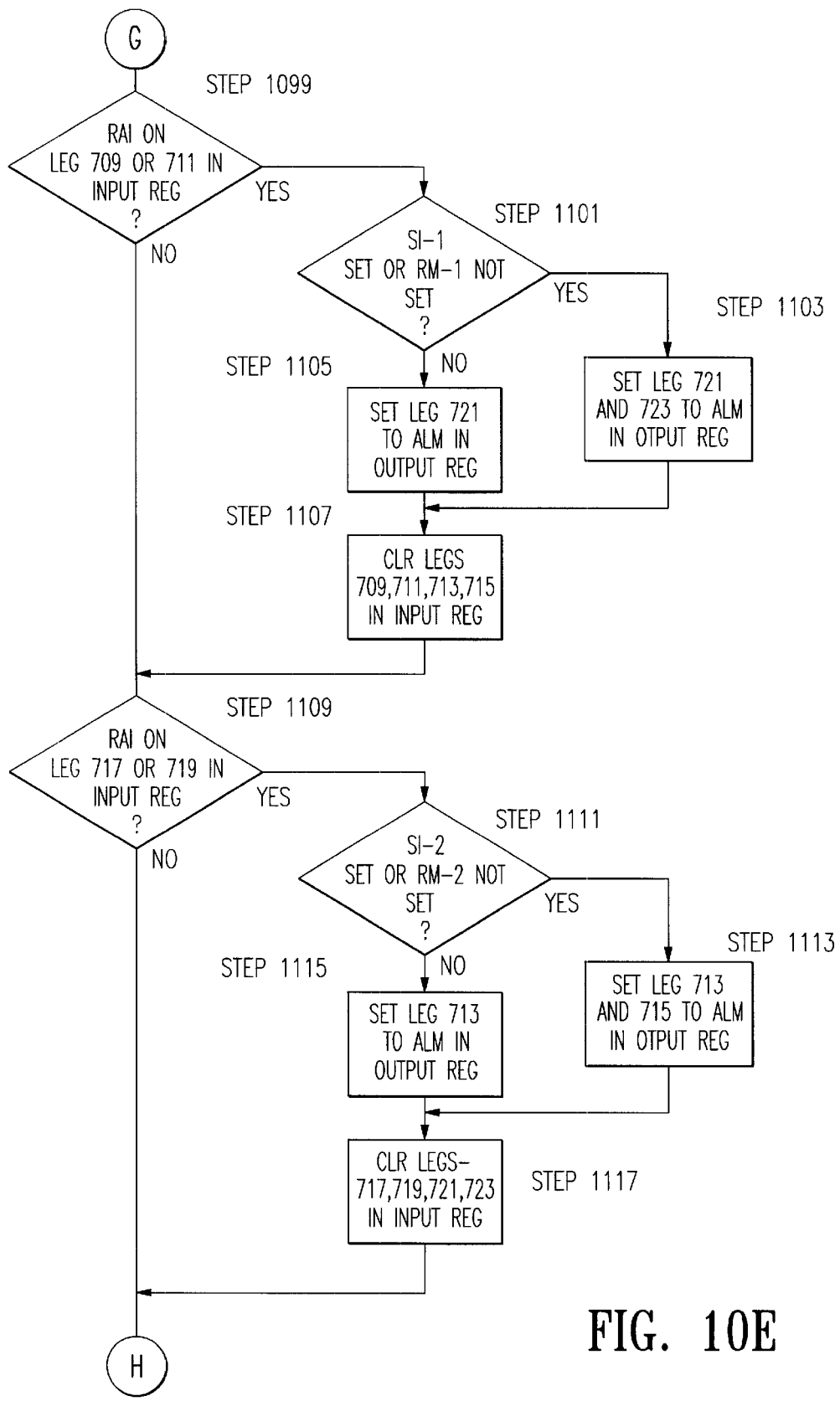
Figure 10F:
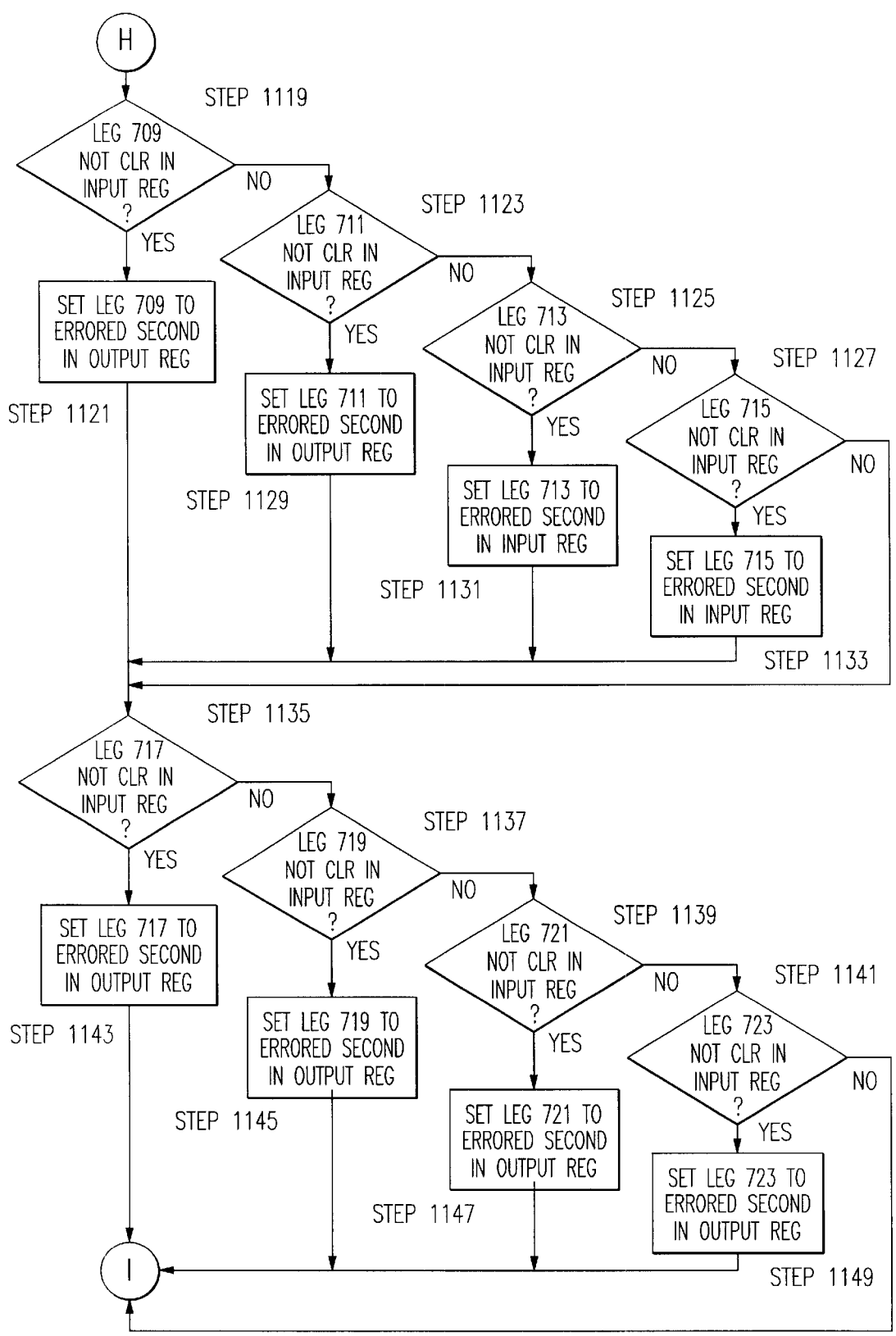
Figure 10G:
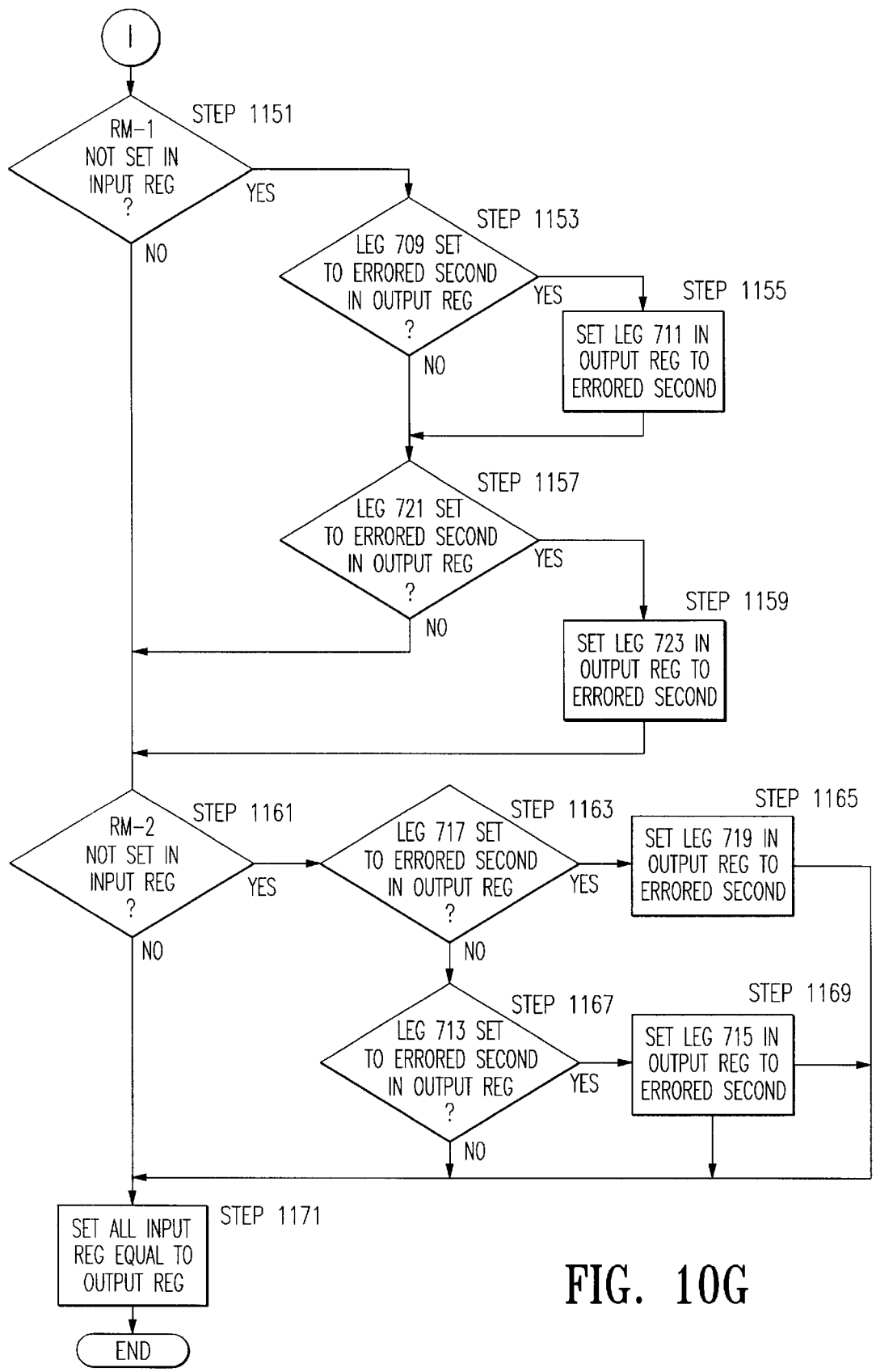

The second stage of the filter operates on the Event Levels associated with all of the legs of the data path 700 for one DS1 signal concurrently. FIG. 9 is a flowchart of the process of the second stage of the filter. Initially, the Event Levels associated with each leg are checked for any change between the New Event Levels and the Old Event Levels (STEP 901). If there has been no change in the Event Levels, then a check is made to determine whether a "Filt-Cnt" value is greater than a predetermined value (STEP 903). If not, then a check is made to determine whether the Old Event Levels have previously been output from the second filter (STEP 905). If so, then the process returns to STEP 901. If not, then the value Filt-Cnt is incremented and then the process returns to STEP 901.

If the Old Event Levels have not been previously output, and these steps are repeated for a sufficient number of times, the value of Filt-Cnt will eventually exceed the predetermined value (which it can be seen represents a "Send Delay" in the output of the Event Levels from the second filter). Once this delay is exceeded (STEP 903), another check is made to determine whether the Old Event Levels have been output previously (STEP 907). If so, then the process loops back to STEP 901. If not, then a determination is made as to whether "Signal Identification" is in progress (STEP 909). That is, as stated above, the Remote Module 703 has the ability to modify AIS and RAI signals to indicate whether those signals are due to an Event that originated at the customer installation or in the LEC/IEC equipment. However, decoding these signals requires monitoring them for a period of time. For example, in one embodiment of the present invention, the AIS-CI signal is identical to the AIS signal for 1.11 seconds, after which the preceding 0.15 seconds are uniquely modified. Likewise, the RAI-CI signal is identical to the RAI signal for 0.99 seconds, after which the preceding 0.090 seconds are uniquely modified. Since the length of a complete modified signal takes 1.26 seconds in the case of AIS-CI and 1.08 seconds in the case of RAI-CI to transmit, Signal Identification requires this amount of time. Therefore, Signal Identification takes place during the time that the ITAU 705 is attempting to determine whether a received RAI or AIS signal has been modified to an RAI-CI or an AIS-CI the system. If Signal Identification is in progress, then a check is made to determine whether a "Max Delay" value has been exceeded by the value of Filt-Cnt (STEP 911). If not, then the value of Filt-Cnt is incremented (STEP 913) and the process returns to STEP 901. However, if the value of Filt-Cnt is equal to or greater than the Max Delay value, the Event Levels are output and the Filt-Cnt value is reset to zero (STEP 915). Next the process returns to STEP 901.

If the Event Levels input to the second stage of the filter change (STEP 901), then a determination is made as to whether any of the New Event Levels are less than the Old Event Levels (STEP 917). If not, then the Filt-Cnt value is reset to zero (STEP 919) and the Old Event Levels are updated with the New Event Levels (STEP 921). The process then returns to STEP 901. However, if at least one of the New Event Levels associated with one of the legs is less than one of the Old Event Levels associated with that same leg, then a determination must be made as to whether the last output Event Levels are also less than the Old Event Levels (STEP 923). If not, then the Filt-Cnt can be reset and the Old Event Levels updated with the New Event Levels, since the higher of the old and New Event Levels were previously output. However, if the last output Event Levels are less than the Old Event Levels, then the Old Event Levels must be output (STEP 925) to prevent the higher Event Levels from being overwritten without being output. Once the Old Event Levels have been output, then the Old Event Levels can be updated with the New Event Levels (STEP 921).

It can be seen from the above description of the second stage of the filter that when the Event Levels are increasing in value, a delay is imposed on the output of those Event Levels in order to prevent the Event Levels from changing too rapidly. However, when the Event Levels are decreasing, the delay is dismissed and the Event Levels are output immediately to ensure that the higher Event Levels are not lost.

While the preferred embodiment of the present invention includes the two stage filter described above and illustrated in FIGS. 3 and 4, in an alternative embodiment, the present invention may have a single stage filter, a filter having more than two stages, or no filter at all.

Sectionalizer Process

After the Event Levels have been filtered, each Mask is preferably sectionalized by the following Sectionalizer Process. FIGS. 10a–10g illustrate a flowchart of the Sectionalizer Process in accordance with one embodiment of the present invention. In accordance with one embodiment of the present invention, the Mask to be operated upon is written to an input register. The output from the process is a Mask that is written to an output register.

In accordance with the process shown in the flowchart of FIGS. 10a–10g, the input register into which the Mask associated with a DS1 channel to be sectionalized is written can be read from, and written into, by the Sectionalizer 707. The present invention preferably results in a Mask being written to an output register. The value of the Mask indicates the leg in which an Event originated, and the type of Event which originated in that leg. For example, if a loss of signal occurred in the data path 700 due to a failure of a component within leg 721, the input register would indicated the presence of an RAI signal at leg 711. The output register would indicate an alarm condition at leg 721 to indicate that the RAI signal received on leg 711 by the ITAU 705 was caused by an alarm condition on leg 721. The following is a detailed description of the process shown in the flowcharts of FIGS. 10a–10g.

Initially, in accordance with one embodiment of the present invention, the values returned from the filter are checked to determine whether the data path is either out of service or under test (STEP 1000). If the the data path is either under test or out of service, then the value of the Mask is written to the output register and the input registers are all set to zero (STEP 1001). As will be seen, setting the input register to all zero causes the process to fall through to the end. Next, the input register is checked to determine whether that portion of the input register associated with leg 711 (hereafter known as "the input value of leg 711") is equal to Event Level "7" (STEP 1002). If the input value of leg 711 is equal to "7", then that portion of the output register associated with leg 709 (hereafter referred to as "the output value of leg 709") is set to "5", indicating an alarm condition on leg 709 (STEP 1003). That is, an alarm condition on leg 709 must be the cause of an AIS-CI signal on leg 711. This can be understood by noting that AIS-CI is generated by the Remote Module 703 upon receipt by that Remote Module over leg 709 of either an AIS signal generated by one of the components in leg 709, or receipt by the Remote Module 703 of a signal which satisfies the requirements for generation of an AIS-CI signal by the Remote Module 703. Since the Remote Module 703 is preferably placed at the point of demarcation between the CPE 702 and the LEC equipment, an alarm condition on leg 709 must have been generated by equipment that is the responsibility of the customer who owns the CPE equipment.

Next, the input values of legs 709, 711, 713, and 715 are cleared (STEP 1005), since any Event which is reported on these legs would be subordinate to (i.e., due to the same condition as) the alarm that is generated at leg 709.

It can be seen that leg 719 is essentially identical to leg 711, however leg 719 carries signals in the opposite direction. Therefore, if an AIS-CI signal was received by the ITAU 705 from the Remote Module 703 (STEP 1009), then the output value of leg 717 is set to "5", indicating an alarm is present at leg 717 (STEP 1011) and the input values of legs 717, 719, 721, and 723 are cleared (STEP 1013).

Next, a determination is made as to whether the input register indicates either that the AIS-1 flag is set, or that leg 711 is in alarm condition (STEP 1015). If so, then a further determination is made as to whether RAI was present on leg 717 as indicated by the input value of leg 717 being equal to "4" (STEP 1017). If the inquiry of STEP 1017 is positive, then the input value of leg 717 is cleared. Likewise, a determination is made as to whether either RAI or RAI-CI are present on leg 719. If the answer to STEP 1021 is positive, then the input value of leg 719 is cleared (STEP 1023). The AIS-1 flag is set by the ITAU 705 when an AIS condition is detected on either leg 709 or 711. Therefore, if the AIS-1 or an alarm condition is detected on leg 711, any RAI signal on legs 717 and 719 would be a result of a condition already detected at leg 711. Accordingly, since neither of these legs is the origin of the Event, the RAI signals can be cleared.

Next, a determination is made as to whether AIS-2 is set or an alarm is detected on leg 719 (STEP 1025). If so, then a further determination is made as to whether RAI was present on leg 717 as indicated by the input value of leg 717 being equal to "4" (STEP 1027). That is, is any RAI signal present on leg 709. If so, then the input value of leg 709 is cleared (STEP 1029). A further inquiry is also made to determine whether either an RAI or RAI-CI signal was received by the ITAU 705 on leg 711. If so, then the input value of leg 711 is cleared. It can be seen that STEPS 1025 through 1033 are analogous to STEPS 1015 through 1023, but dealing with signals flowing in the opposite direction.

Next, a determination is made as to whether RAI-CI is present on leg 711, as indicated by the input value of leg 711 (STEP 1035). If the answer to the inquiry of STEP 1035 is positive, then the source of the Event is an alarm condition on leg 723. Therefore, the output value of leg 723 will be set to an Event Level of "5" indicating an alarm condition on leg 723 (STEP 1037). The input values of legs 709, 711, 721, and 723 are then cleared (STEP 1039), because the RAI or RAI-CI indicates on which leg the Event occurred. It should be noted that the RAI or RAI-CI signal prevent PRMs from being reported, so there is no visibility on legs 709 and 711 when RAI or RAI-CI is present.

Similar to STEPS 635–639, a determination is made as to whether RAI-CI is present on leg 719, as indicated by the value of the Mask stored in the input register (STEP 1041). If the answer to the inquiry of STEP 1041 is positive, then the source of the Event is an alarm condition on leg 715. Therefore, that portion of the output register which is associated with leg 715 will be set to an Event Level of "5" indicating an alarm condition on leg 715 (STEP 1043). Those portions of the input register associated with legs 713, 715, 717, and 719 can be cleared (STEP 1045).

Next, a determination is made as to whether an alarm is present on either leg 709 or leg 711, as indicated by the input values of legs 709 and 711 (STEP 1047). If either of these legs are in alarm, a next determination is made as to whether the flag SI-1 is set in the Mask stored in the input register (STEP 1049). The ITAU 705 has already determined whether an AIS or AIS-CI signal has been received by the ITAU 705. Therefore, if the SI-1 flag is not set (STEP 1049) and both the AIS-1 flag and the RM-1 flag are set (STEP 1051), then the output value of leg 711 is set to "5" (STEP 1053) indicating that the origin of the Event is an alarm condition on leg 711.

Otherwise, if the answer to the inquiry of STEP 1051 is negative, then a determination can not be made as to whether the Event originated at leg 709 or 711. Accordingly, the output values of legs 709 and 711 are set to the input values of each leg 709 and 711, respectively (STEPS 655 and 657).

If the inquiry of STEP 1049 is answered in the positive (the ITAU 705 has not yet been able to determine whether the signal being received is an AIS or an AIS-CI), then once again a determination can not be made as to whether the Event originated at leg 709 or 711. Accordingly, the output value of legs 709 and 711 is set to the input value of legs 709 and 711 (STEPS 659 and 661). Next, if that the input register value of leg 711 indicates that leg 711 is in alarm condition (STEP 1063), then the input values of legs 713 and 715 are cleared (STEPS 665 and 667), since the cause of the alarms in legs 713 and 715 is the alarm condition present on leg 711. Regardless of whether the answer to the inquiry in STEP 1063 is positive or negative, the input values of legs 709 and 711 are cleared (STEPS 669 and 671), since the origin of these alarms has already been determined.

Next, if the answer to the inquiry in STEP 1047 is positive and the SI-2 flag is not set, then the ITAU 705 has already determined whether an AIS or AIS-CI signal has been received by the ITAU 705. Therefore, if the SI-2 flag is not set (STEP 1075) and both the AIS-2 flag and the RM-2 flag are set (STEP 1077), then the output value of leg 719 is set to Event Level "5" (STEP 1079) indicating that the origin of the Event is an alarm condition on leg 719.

Otherwise, if the answer to the inquiry of STEP 1077 is negative, then a determination can not be made as to whether the Event originated at leg 717 or 719. Accordingly, the output values of legs 717 and 719 are set to the input values of 717 and 719 (STEPS 681 and 683).

If the inquiry of STEP 1075 is answered in the positive (the ITAU has not yet been able to determine whether the signal being received is an AIS or an AIS-CI), then once again a determination can not be made as to whether the Event originated at leg 717 or 719. Accordingly, the output values of legs 717 and 719 is set to the input values of legs 717 and 719 (STEPS 685 and 687). Next, if input value of leg 719 indicates that leg 719 is in alarm condition (STEP 1089), then the input value of both legs 721 and 723 are cleared (STEPS 691 and 693), since the cause of the alarms in legs 721 and 723 is the alarm condition present on leg 719. Regardless of whether the answer to the inquiry in STEP 1089 is positive or negative, the input values of legs 717 and 719 are cleared (STEPS 695 and 697), since the origin of these alarms has already been determined.

Next, if the input values of legs 709 and 711 indicate that an Event Level of "4" (RAI) is present on either of these legs (STEP 1099), then the SI-1 flag and the RM-1 flag are checked (STEP 1101). If either the SI-1 flag is set or the RM-1 flag is not set, then both the output values of legs 721 and 723 are set to Event Level "5" to indicate that an alarm condition has originated in either leg 721 or 723 (STEP 1103). It should be noted that while the present invention functions without an improved network interface unit, such as the Remote Module, the ability to determine the exact origin of an Event is limited in some cases, such as the case in which an alarm is present on the signal received by the ITAU 705 from the CSU 701. The fact that the signals RAI-CI and AIS-CI may take longer to detect then RAI and AIS signals, can slow down the process. Therefore, in the preferred embodiment, the process suffers the ambiguity that is present when the Remote Module is not present if the RAI-CI or AIS-CI signal are not detected by the time they are needed by the process (as indicated by the fact that the SI-1 or SI-2 flag is set).

If the Remote Module is present, and the ITAU 705 has determined that the received signal is RAI and not RAI-CI, then the output value of leg 721 is set to Event Level "5" to indicate an alarm condition originated at leg 721 (STEP 1105). Regardless of the response to the inquiry of STEP 1101, the input values of legs 709, 711, 713, and 715 are cleared (STEP 1107), because the RAI or RAI-CI indicates on which leg the Event occured. As noted above, the RAI or RAI-CI signals prevents PRMs from being reported, so there is no visibility on legs 709 and 711 when RAI or RAI-CI is present.

Next, if the input values of legs 717 and 719 indicate that an Event Level of "4" (RAI) is present on either of these legs (STEP 1009), then the SI-1 flag and the RM-1 flag are checked (STEP 1111). If either the SI-1 flag is set or the RM-1 flag is not set, then both the output values of legs 713 and 715 are set to Event Level "5" to indicate that an alarm condition has originated in either leg 713 or 715 (STEP 1113).

If the Remote Module is present, and the ITAU 705 has determined that the received signal is RAI and not RAI-CI, then the output value of leg 713 is set to Event Level "5" to indicate an alarm condition originated at leg 713 (STEP 1115). Regardless of the response to the inquiry of STEP 1109, the input values of legs 717, 719, 721, and 723 are cleared (STEP 1117), since the RAI or RAI-CI indicates on which leg the Event occured. The RAI or RAI-CI signal itself prevents PRMs from being reported, so there is no visibility on legs 717 and 719 when RAI or RAI-CI is present.

Next the input value of each leg is checked to determine whether an errored second has occurred in each leg. First the input value of leg 709 is checked (STEP 1119). If not equal to zero, then the output value of leg 709 is set to an Event Level which is indicative of the presence of an errored second on the leg (STEP 1121). If the input value of leg 709 is not set, then the input value of leg 711 is checked (STEP 1123). If not set, then the input value of leg 713 is checked (STEP 1125). If not set, then the input value of leg 715 is checked (STEP 1127). In each case, if the input value is set (i.e., not equal to zero, indicative of the fact that any Event is present), then the output value corresponding to the input value is set to "1" to indicate the presence of an errored second (STEPS 729, 771, and 733). The same process is followed with regard to legs 717, 719, 721, and 723 in STEPS 735–749.

Next, since legs 709 and 711 would be a single leg in the absence of the Remote Module 703, when the input value of the RM-1 flag is zero, then any errored seconds which occur in leg 709, also occur in leg 711. Therefore, if the input value of the RM-1 flag is equal to zero (STEP 1151), and the output value of leg 709 is equal to "1" (indicating an errored second) (STEP 1153), then the output value of leg 711 is set to "1" (STEP 1155). Likewise, if the output value of leg 721 is indicative of an errored second (STEP 1157), then the output value of leg 723 is set to indicate the presence of an errored second (STEP 1159).

In the other direction, if the input value of the RM-2 flag is equal to zero (STEP 1161), and the output value of leg 717 is equal to "1" (indicating an errored second) (STEP 1163), then the output value of leg 719 is set to "1" (STEP 1165). Likewise, if the output value of leg 713 is indicative of an errored second (STEP 1167), then the output value of leg 715 is set to indicate the presence of an errored second (STEP 1169).

Finally, to conclude the process, the entire input register is set equal to the entire output register (STEP 1171). In accordance with one embodiment of the present invention, the mask that is output from the Sectionalizer is compared with the last recorded output from the Sectionalizer, and if different is stored in a storage device, such as a magnetic disk storage device, or optical disk storage device. Since the Mask is only stored if it differs, the amount of data that is stored is reduced. The Mask may also be displayed if requested by the user, and may be communicated over a communications link, such as an asynchronous or X.25 communication channel, using a conventional protocol, such as the TL1 protocol defined by Bellcore and used in communications between the ITAU 705 and an Operations System (OS). Since data is stored and forwarded only upon detection of a change in the state of the Mask (i.e., only when an Event is initially detected or ceases to be detected), the amount of information which must be transmitted to the OS is greatly reduced.

It will be understood by those skilled in the art that the particular order in which the process is performed is not essential to the present invention. However, certain benefits are gained by processing first the Event Levels that clearly indicate a particular origin for an Event, such as the RAI-CI and AIS-CI Event Levels. Furthermore, in some cases, altering the order may cause ambiguity as to the source of an Event. For example, if RAI is processed before RAI-CI, then RAI-CI must be checked to determine whether the RAI-CI is the cause of the RAI. Nonetheless, a simple check to see if RAI-CI is present would be sufficient in this case to dismiss the ambiguity (assuming that an improved network interface module, such as a Remote Module, is present). If no Remote Module is present, then the ambiguity will exist regardless of the order in which the Events are processed.

In accordance with one embodiment of the present invention, information used to generate the Mask that is input to the first filter is provided approximately once every second by the ITAU 705. Preferably, the ITAU 705 includes one or more programmable devices which are used to perform both the conventional ITAU 705 tasks and those tasks which are required by the present invention. It should be clear to those skilled in the art that tasks may be assigned to particular programmable devices within the ITAU 705 in any manner that results in the assigned tasks being properly completed. In the case in which the Sectionalizer of the present invention is a program which is executed by at least one of the same programmable devices which execute conventional ITAU functions, the information used to generate the raw data Mask is output from the ITAU by writing the information into a shared memory. In one case in which the level of integration is great between the ITAU 705 and the Sectionalizer 707 functions, the ITAU 705 performs the function of generating the Mask as part of the processing of the information received over the data path 700.

Sectionalizer Output

The output from the Sectionalizer 707 is preferably displayed in one of three "Modes" and two "Views", as described above. The display preferably graphically illustrates the data path and indicates the status of each leg of the data path by indicating that status directly on, or in close proximity to, the line on the display that represents that leg. FIG. 7 is an illustration of an output display image in accordance with one embodiment of the present invention. When in Filtered mode, the display indicates status of each leg of the data path after the raw data presented by the ITAU 705 has been filtered by the first and second filters described above and illustrated in the flowcharts of FIGS. 4 and 5. By filtering the raw data, the number of times the output data will change is reduced, making it easier for the user to determine the overall status of the data path 700. In Current mode, the data is displayed prior to filtering. The output format is identical to the format used to display the data in Filtered Mode. However, in History mode, the display outputs a date/time stamp indicating when the Mask was recorded. The user may then scroll back through the history of the data path one Event at a time. Since only changes in the status of the data path are recorded, each piece of data that is available in history mode indicates the status of the data path at a point in time when the status of the data path changed.

In addition to displaying the output, in accordance with the preferred embodiment of the present invention, the data can be output to an external device over a communications link, such as Transaction Language 1 (TL1). The following protocol is used in one embodiment of the present invention. A command is communicated to the Sectionalizer in the following form:
RTRV-SECT-T1:[TID]:AID: [CTAG]: :[MODE], [VIEW], [EVENTS], [TMPER], [DATE], [TIME];

The first portion of the command ("RTRV-SECT-T1") indicates the type of command. The TID identifies the ITAU system. The AID is the code used to identify the particular T1 line for which information is sought. The CTAG correlates a command with a response. The mode parameter allows the user to request a particular mode from among the three available modes (current, filtered, history). The View parameter allows the user to select from among the two available views (data, sectionalized). Each of the remaining parameters are used if history mode is requested. If history mode is selected, then the Events parameter allows the user to specify the number of events to retrieve, starting from the end of the history file. The present invention preferably stores up to 500 events for each T1 line. The TMPER parameter allows the user to specify a period of time over which the user would like to see information. The DATE parameter allows the user to specify the date of the first file to be retrieved. The TIME parameter allows the user to specify the time of the first data file to be retrieved.

In accordance with this embodiment, the response is returned in the following form:
SID DATE TIME
M COMPLD
  "AAAAA, T1: V=B, MSK=CCCCCCCC, AIS=DD, RM=EE, CP=FF, DATE=MM-DD-YYYY, TIME=HH-MM-SS"
;

The SID is the source identifier. The DATE is the current date on which the information is communicated. The TIME is the time of the communication. The value "AAAAA" is the AID field. The value "V" is the view in which the data will be communicated. If equal to S, then the data is returned in Sectionalizer view, if equal to D, then the data is returned in Data view, if T, then the circuit is under test, and if O, then the circuit is out of service.

The value "CCCCCCCC" represents the 24 bits of that portion of the Mask which represents the status of each of the eight legs. The value is presented as eight octal digits, each representing the Event Level of one of the legs. The value "DD" represents the status of the AIS-1 and AIS-2 flags, each digit representing the state of one of these two flags.

The value "EE" represents the status of the RM-1 and RM-2 flags, each digit represents the status of one of the two flags. The value "FF" indicates whether the CSU 701 is generating PRMs, each digit represents the CSU 701 at one end of the data path 700. The value "MM-DD-YYYY" represents the date, and the value "HH-MM-SS" represents the time of day.

In addition to the command/response form of communication, in accordance with one embodiment of the present invention, autonomous messages may be generated and transmitted. The format of these autonomous messages is as follows:
SID MDATE MTIME
A ATAG REPT EVT T1
  "AAAAA:NISECT, SE, EDATE, ETIME
  \"CIRCUIT SECTIONALIZER MESSAGE\",
  \"V=B, MSK=CCCCCCCC, AIS=DD, RM=EE, CP=FF, DATE=MM-DD-YYY, TIME=HH-MM-SS\"
"
;

Each of the parameters is the same as above, however, MDATE and MTIME are a time stamp indicating when the report was issued. EDATE and ETIME are a time stamp indicating when the report queued to issue. In addition, SE is a parameter which indicates the status of the Event. That is, if SE is equal to "SC", then an Event has occurred. If, on the other hand, SE is equal to "CL", then the no Events have occurred.

It will be understood by those skilled in the art that any means may be used to communicate the information from the Sectionalizer 707 to other components of the communication system.

Summary

A number of embodiments of the present invention have been described. Nevertheless, it will be understood that various modifications may be made without departing from the spirit and scope of the invention, For example, the Sectionalizer is described herein as being preferably located within the ITAU. However, the Sectionalizer may be a stand-alone device which receives information from a performance monitoring device, such as an ITAU or another such performance monitoring device. Furthermore, the present invention may be used with or without Remote Modules. However, it will be clear that having Remote Modules present enhances the ability of the present invention to sectionalize Events. Still further, it should be understood that the present invention may be implemented as a set of program instructions stored on a manufactured medium, such as a "floppy disk" or compact disk optical storage device, these instructions being executed by any programmably controlled device. Alternatively, the present invention may be implemented as a state machine, hardware device in which each of the functions are performed by dedicated hardware circuits, or as an Application Specific Integrated Circuit (ASIC). Still further, the present invention is described in the context of T1 telephone circuits. However, the present invention may be used in any communication circuit in which signals are monitored and diagnostics are required in order to determine the status of the circuit in two directions without disrupting traffic on the circuit, such as HDSL or DS3 transmission circuits. In addition, the particular Events that are monitored and reported are dependent upon the particular circuit that is being monitored. Thus, the present invention may define the particular Events that are detected and reported in any manner which is applicable to the circuit that is being monitored. Further yet, it should be understood that some of the benefits of the present invention may be achieved even if the monitoring devices and the Sectionalizer do not communicate over the data path, but rather communicate over a discrete communication link, such as a wireless link or a separate modem link unrelated to the data path being monitored.

Accordingly, it is to be understood that the invention is not to be limited by the specific illustrated embodiments, but only by the scope of the appended claims.

What is claimed is:

1. A system for dividing a data path into a plurality of legs and determining in which of the plurality of legs an Event has originated, including:
   (a) a monitoring device capable of monitoring signals on the data path to detect either one or more Events or a signal indicative of an occurrence of one or more Events, the placement of the monitoring device defining a first end of a first, second, third and fourth leg, the second end of the first and second leg being defined by a terminating device; and
   (b) sectionalizer device coupled to the monitoring device over the third and fourth leg of the data path adapted to receive signals from the monitoring device indicating in which leg one of the Events originated based upon the received signals, the placement of the sectionalizer device defining the second end of the third and fourth leg;
   wherein the monitoring device transmits a variant of a conventional alarm indication signal in response to detection of conditions which would otherwise lead to transmission of a conventional alarm indication signal if detected by the monitoring device on the signal from the data path; and
   wherein the variant of the conventional alarm indication signal is a pattern of unframed ones in which a portion of the pattern has been modified to include a predetermined number of zeros.

2. The system of claim 1, wherein the predetermined number of zeros is not great enough to prevent the variant of the conventional alarm indication signal from being included within the definition of a conventional alarm indication signal.

3. A system for generating information regarding the origin of Events in a data path and determining the origin of the Events based upon the generated information, including:
   (a) at least one monitoring device capable of monitoring signals on the data path to detect either the Events or a signal indicative of an occurrence of one of the Events; and
   (b) a sectionalizer device coupled to the at least one monitoring device for receiving data indicating which of the at least one monitoring devices has detected either one of the Events or a signal indicative of an occurrence of one of the Events, and for determining the data path origin of the Event based upon the received signals;
   wherein at least one of the at least one monitoring devices is located at a network interface; and
   wherein the monitoring device sends a remote alarm indication signal to the network over an extended superframe data link in response to detection of the presence of an alarm on the in-band signal received from the network, and transmits a variant of the remote alarm indication signal to the network over the data link in response to detection of a remote alarm indication signal received over the extended superframe data link from the customer installation and the absence of an alarm on the in-band signal received from the network.

4. The system of claim 3, wherein the variant of the remote alarm indication signal is a conventional ANSI extended superframe format remote alarm indication signal modified by an unscheduled message which replaces a portion of the conventional ANSI extended superframe format remote alarm indication in a manner which permits the variant to meet the definition of the remote alarm indication, and thus be detected as a remote alarm indication by upstream devices.

5. A sectionalizer within a system for generating information regarding the origin of one or more Events in a data path and determining the origin of the respective Event based upon the generated information, having at least one monitoring device capable of monitoring signals on the data path to detect either the Event or a signal indicative of an occurrence of the Event, the sectionalizer, including:
   (a) a sectionalizer device adapted to be coupled to the at least one monitoring device, and including:
       (1) a receiver which receives signals indicating which of the at least one monitoring devices has detected either the Event or a signal indicative of an occurrence of the Event; and
       (2) a processing device for determining the origin of the Event based upon the received signals;
   wherein at least one of the at least one monitoring devices is located at a network interface; and
   wherein the monitoring device sends a remote alarm indication signal to the network over an extended superframe data link in response to detection of the presence of an alarm on the in-band signal received from the network, and transmits a variant of the remote alarm indication signal to the network over the data link in response to detection of a remote alarm indication signal received over the extended superframe data link from the customer installation and the absence of an alarm on the in-band signal received from the network.

6. A sectionalizer within a system for generating information regarding the origin of one or more Events in a data path and determining the origin of the respective Event based upon the generated information, having at least one monitoring device capable of monitoring signals on the data path to detect either the Event or a signal indicative of an occurrence of the Event, the sectionalizer, including:

(a) a sectionalizer device adapted to be coupled to the at least one monitoring device, and including:
(1) a receiver which receives signals indicating which of the at least one monitoring devices has detected either the Event or a signal indicative of an occurrence of the Event; and
(2) a processing device for determining the origin of the Event based upon the received signals;

wherein at least one of the at least one monitoring devices is located at a network interface;

wherein the monitoring device sends a remote alarm indication signal to the network over an extended superframe data link in response to detection of the presence of an alarm on the in-band signal received from the network, and transmits a variant of the remote alarm indication signal to the network over the data link in response to detection of a remote alarm indication signal received over the extended superframe data link from the customer installation and the absence of an alarm on the in-band signal received from the network; and wherein the variant of the remote alarm indication signal is a conventional ANSI extended superframe format remote alarm indication signal modified by an unscheduled message which replaces a portion of the conventional ANSI extended superframe format remote alarm indication in a manner which permits the variant to meet the definition of the remote alarm indication, and thus be detected as a remote alarm indication by upstream devices.

7. A sectionalizer within a system for generating information regarding the origin of one or more Events in a data path and determining the origin of the respective Event based upon the generated information, having at least one monitoring device capable of monitoring signals on the data path to detect either the Event or a signal indicative of an occurrence of the Event, the sectionalizer, including:

(a) a sectionalizer device adapted to be coupled to the at least one monitoring device, and including:
(1) a receiver which receives signals indicating which of the at least one monitoring devices has detected either the Event or a signal indicative of an occurrence of the Event; and
(2) a processing device for determining the origin of the Event based upon the received signals;

wherein at least one of the at least one monitoring devices is located at a network interface; and wherein the monitoring device transmits a variant of a conventional alarm indication signal in response to detection of conditions which would lead to transmission of an alarm indication signal from the customer installation; and wherein the variant of the alarm indication signal is a pattern of unframed ones in which a portion of the pattern has been modified to include a predetermined number of zeros.

8. The sectionalizer of claim 7, wherein the predetermined number of zeros is not great enough to prevent the variant from being included within the definition of a conventional alarm indication signal.

9. In a communications system including customer premises equipment (CPE), an Integrated Transport Access Unit (ITAU), and a monitoring device located between the CPE and ITAU, a method for identifying where in the system one or more Events originate, including:

(a) receiving a signal comprising at least one of the following:
(1) a Remote Alarm Indication (RAI) signal;
(2) a Remote Alarm Indication-Customer Installation (RAI-CI) signal;
(3) an Alarm Indication Signal (AIS); and
(4) an Alarm Indication Signal-Customer Installation (AIS-CI);

(b) detecting errors on the signal received from the remote monitoring device by the ITAU;

(c) if an AIS-CI signal is received by the ITAU, then indicating that the Event originated on the leg from the CPE to the remote monitoring device;

(d) if an AIS signal is received by the ITAU, then indicating that the Event originated on the leg from the remote monitoring device to the ITAU;

(e) if an alarm signal is present at the input to the ITAU, then indicating that the Event originated on the leg from the remote monitoring device to the ITAU;

(f) if no AIS, AIS-CI, or alarm signal is received from the remote monitoring device at the input to the ITAU, and if an RAI-CI signal is received at the input to the ITAU, then indicating that the Event originated on the leg from the remote monitoring device to the CPE; and (g) if no AIS, AIS-CI, or alarm signal is received from the remote monitoring device at the input to the ITAU, and if an RAI signal is received at the input to the ITAU, then indicating that the Event originated on the leg from the ITAU to the remote monitoring device.

10. The method of claim 9, further including:

(a) receiving at the ITAU a message indicating whether errors have been detected at an input to the monitoring device from the CPE, at the input to the remote monitoring device from the ITAU, or at the input to the CPE from the remote monitoring device; and (b) if no RAI, RAI-CI, AIS, AIS-CI, or alarm signal is detected at the inputs to the ITAU, and if a message is detected at the input to the ITAU which indicates that an error has occurred on the signal received at the input to the remote monitoring device from the CPE, then indicating that the Event has originated on the leg from the CPE to the remote monitoring device;

(c) if no RAI, RAI-CI, AIS, AIS-CI, is detected at the inputs to the ITAU, and if an alarm signal is detected at the input to the ITAU, then indicating that the Event has originated on the leg from the remote monitoring device to the ITAU;

(d) if no RAI, RAI-CI, AIS, AIS-CI, or alarm signal is detected at the inputs to the ITAU, and if a message is detected at the input to the ITAU which indicates that an error has occurred on the signal received at the input to the remote monitoring device from the ITAU, then indicating that the Event has originated on the leg from the ITAU to the remote monitoring device;

(e) if no RAI, RAI-CI, AIS, AIS-CI, or alarm signal is detected at the inputs to the ITAU, and if a message is detected at the input to the ITAU which indicates that an error has occurred on the signal received at the input to the CPE from the remote monitoring device, then indicating that the Event has originated on the leg from the remote monitoring device to the CPE.

11. An article of manufacture, comprising a data storage medium tangibly embodying a program of machine-readable instructions executable by a digital processing apparatus to perform method steps for identifying one or more Events that originate in a communications system including customer premises equipment (CPE), an Integrated Transport Access Unit (ITAU), and a monitoring device located between the CPE and ITAU, the method including:

(a) receiving at least one of the following:
   (1) a Remote Alarm Indication (RAI) signal;
   (2) a Remote Alarm Indication-Customer Installation (RAI-CI) signal;
   (3) an Alarm Indication Signal (AIS); and
   (4) an Alarm Indication Signal-Customer Installation (AIS-CI);

(b) detecting errors on the signal received from the remote monitoring device by the ITAU;

(c) if an AIS-CI signal is received by the ITAU, then indicating that the Event originated on the leg from the CPE to the remote monitoring device;

(d) if an AIS signal is received by the ITAU, then indicating that the Event originated on the leg from the remote monitoring device to the ITAU;

(e) if an alarm signal is present at the input to the ITAU, then indicating that the Event originated on the leg from the remote monitoring device to the ITAU;

(f) if no AIS, AIS-CI, or alarm signal is received from the remote monitoring device at the input to the ITAU, and if an RAI-CI signal is received at the input to the ITAU, then indicating that the Event originated on the leg from the remote monitoring device to the CPE; and (g) if no AIS, AIS-CI, or alarm signal is received from the remote monitoring device at the input to the ITAU, and if an RAI signal is received at the input to the ITAU, then indicating that the Event originated on the leg from the ITAU to the remote monitoring device.

12. A system for determining the status of a telecommunications circuit, including:

(a) a monitoring device located at a network interface between the telecommunications circuit and a customer installation, for generating data derived from the content of signals received by the monitoring device from the circuit and transmitting the generated data; and (b) a sectionalizer device, coupled by the circuit to the monitoring device, for receiving said generated data from the monitoring device, detecting when an Event has occurred, and determining, based upon the generated data, in which portion of the circuit from among multiple circuit portions the Event originated;

wherein the sectionalizer device includes a filter that time correlates Events detected and reported by more than one sectionalizer device; and wherein the filter delays the processing of the data received by the sectionalizer device for a predetermined amont of time, the delay beginning at the time a new event is reported.

13. The system of claim 12, wherein Events detected by either the monitoring device or the sectionalizer device are assigned an event level, and the filter delays are terminated if the received data includes an event level which is greater than a subsequently received event level.

14. A system for generating information regarding the origin of Events in a data path and determining the origin of the Events based upon the generated information, including:

(a) at least one monitoring device capable of monitoring signals on the data path to detect either the Events or a signal indicative of an occurrence of one of the Events; and (b) a sectionalizer device coupled to the at least one monitoring device for receiving data indicating which of the at least one monitoring devices has detected either one of the Events or a signal indicative of an occurrence of one of the Events, and for determining the data path origin of the Event based upon the received signals;

wherein at least one of the at least one monitoring devices is located at a network interface;

wherein the monitoring device transmits a variant of a conventional alarm indication signal in response to detection of conditions which would otherwise lead to transmission of an alarm indication signal from the customer installation; and wherein the variant of the alarm indication signal is a pattern of unframed ones in which a portion of the pattern has been modified to include a predetermined number of zeros.

15. The system of claim 14, wherein the predetermined number of zeros is not great enough to prevent the variant from being included within the definition of a conventional alarm indication signal.

16. A sectionalizer within a system for determining the status of a telecommunications circuit, having a monitoring device located between the telecommunications circuit and a customer installation for generating data derived from the content of signals received by the monitoring device over the circuit and transmitting the generated data, the sectionalizer including:

(a) receiving means for receiving the generated data from the monitoring device:

(b) detecting means, coupled to the receiving means for detecting that one or more Events have occurred; and (c) determining means, coupled to the detecting means and the receiving means, for determining, based upon the received data and in response to detection of one of the Events by the detecting means, in which portion of the circuit from among multiple circuit portions the Event originated;

further including a filter that time correlates detected Events;

wherein the filter delays the processing of the data received by the sectionalizer device for a predetermined amount of time, the delay beginning at the time a new event is reported.

17. The sectionalizer of claim 16, wherein the Events detected by either the monitoring device or the sectionalizer are assigned an even level, and the filter delays are terminated if the received data includes an event level which is greater than a subsequently received event level.

* * * * *